(12) United States Patent
Yu et al.

(10) Patent No.: US 9,801,148 B2
(45) Date of Patent: Oct. 24, 2017

(54) APPARATUS AND METHOD FOR ACQUIRING D2D SYNCHRONIZATION INFORMATION

(71) Applicant: Samsung Electronics Co., Ltd, Suwon-si, Gyeonggi-do (KR)

(72) Inventors: Hyun-Kyu Yu, Suwon-si (KR); Hyun-Seok Ryu, Yongin-si (KR); Seung-Hoon Park, Seoul (KR); Cheol Jeong, Seongnam-si (KR); Sang-Won Choi, Suwon-si (KR); Peng Xue, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 229 days.

(21) Appl. No.: 14/707,535

(22) Filed: May 8, 2015

(65) Prior Publication Data
US 2015/0327193 A1 Nov. 12, 2015

(30) Foreign Application Priority Data
May 9, 2014 (KR) .................. 10-2014-0055915

(51) Int. Cl.
*H04W 56/00* (2009.01)
(52) U.S. Cl.
CPC .................. *H04W 56/001* (2013.01)
(58) Field of Classification Search
None
See application file for complete search history.

(56) References Cited

U.S. PATENT DOCUMENTS

| 2011/0258313 A1* | 10/2011 | Mallik | H04W 8/005 709/224 |
| 2012/0011247 A1* | 1/2012 | Mallik | H04W 8/005 709/224 |

(Continued)

FOREIGN PATENT DOCUMENTS

| KR | 2013 0128182 A | 11/2013 |
| WO | WO 2013025057 A2 | 2/2013 |

OTHER PUBLICATIONS

International Search Report dated Aug. 21, 2015 in connection with International Application No. PCT/KR2015/004615; 13 pages.

(Continued)

*Primary Examiner* — Brian Roberts

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). An apparatus and method for acquiring synchronization information through the transmission and reception of signals between devices for device to device (D2D) communication is provided. A method for a user equipment (UE) in a wireless communication system includes detecting a synchronization signal of another UE in a predetermined measurement gap. The method also includes transmitting a detected result of the synchronization signal to an evolved Node B (eNB). A start time point of the measurement gap in a first measurement gap period and a start time point of the measurement gap in a second measurement gap period are different from each other.

24 Claims, 40 Drawing Sheets

(56) References Cited

U.S. PATENT DOCUMENTS

| | | | |
|---|---|---|---|
| 2012/0258706 A1 | 10/2012 | Yu et al. | |
| 2013/0308625 A1 | 11/2013 | Park et al. | |
| 2014/0031028 A1* | 1/2014 | Yamada | H04W 76/023 455/419 |
| 2014/0094162 A1* | 4/2014 | Heo | H04W 52/0258 455/422.1 |
| 2014/0295832 A1* | 10/2014 | Ryu | H04W 48/16 455/434 |
| 2015/0296443 A1* | 10/2015 | Lim | H04W 48/12 370/312 |

OTHER PUBLICATIONS

Written Opinion of the International Searching Authority dated Aug. 21, 2015 in connection with International Application No. PCT/KR2015/004615; 8 pages.

Blackberry UK LTD; "Configuration and Reception of D2D Synchronization and Control Channels"; 3GPP TSG-RAN WG1 #75; R1-135554; San Francisco, CA; Nov. 11-15, 2013; 5 pages.

Nokia, NSN; "Discussion on D2D Synchronization Procedures for Communication and Discovery"; 3GPP TSG-RAN WG1 Meeting #76bis; R1-141542; Shenzhen, China; Mar. 31-Apr. 4, 2014; 5 pages.

\* cited by examiner

TRANSMIT COMMAND FOR ATTEMPTING
TO DETECT D2DSS TO D2D UEs BELONGING — S1710
TO eNB AND RELATED INFORMATION

FIG.17A

APPARATUS AND METHOD FOR ACQUIRING D2D SYNCHRONIZATION INFORMATION

CROSS-REFERENCE TO RELATED APPLICATION AND CLAIM OF PRIORITY

The present application is related to and claims priority under 35 U.S.C. §119(a) to Korean Application Serial No. 10-2014-0055915, which was filed in the Korean Intellectual Property Office on May 9, 2014, the entire content of which is hereby incorporated by reference.

TECHNICAL FIELD

The present disclosure relates to device to device (D2D) communication.

BACKGROUND

To meet the demand for wireless data traffic having increased since deployment of 4G communication systems, efforts have been made to develop an improved 5G or pre-5G communication system. Therefore, the 5G or pre-5G communication system is also called a. 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Device to device (D2D) communication has recently received a lot of attention. In order to perform D2D communication, a process of setting synchronization between devices can be used. Synchronization between devices is set using time information provided from a synchronization base station or a Global Positioning System (GPS). However, there may be a case in which the time information is not provided from the synchronization base station or the GPS.

SUMMARY

To address the above-discussed deficiencies, it is a primary object to provide an apparatus and a method for acquiring synchronization information through the transmission and reception of signals between devices for device to device (D2D) communication.

The present disclosure is also directed to providing an apparatus and a method for acquiring synchronization information between devices for D2D communication even in a situation in which time information for synchronization is not provided. The present disclosure is also directed to providing an apparatus and a method for acquiring synchronization information between D2D user equipments (UEs) belonging to a specific evolved Node B (eNB) and D2D UEs located in an area in which they cannot communicate with an eNB. The present disclosure is also directed to providing an apparatus and a method for acquiring synchronization information between D2D UEs belonging to different eNBs.

In a first example, a method for a UE in a wireless communication system is provided. The method includes measuring at least one neighboring UE at a device to device (D2D) operation frequency. The method also includes transmitting a measurement result to an eNB The measurement result includes information regarding at least one signal of neighboring UE satisfying a specific condition.

In a second example, a method for an eNB in a wireless communication system is provided. The method includes receiving a measurement result from a UE. The measurement result includes information regarding at least one signal of at least one neighboring UE, which is measured at a device to device (D2D) operation frequency by the UE, the signal satisfying a specific condition.

A user equipment (UE) in a wireless communication system is provided. The UE includes a processor configured to measure at least one neighboring UE at a device to device (D2D) operation frequency. The UE also includes transmitter configured to transmit a measurement result to an eNB. The measurement result includes information regarding at least one signal of neighboring UE satisfying a specific condition An apparatus of an eNB in a wireless communication system is provided. The apparatus includes a receiver configured to receive a measurement result from a UE. The the measurement result includes information regarding at least one signal of at least one neighboring UE, which is measured at a device to device (D2D) operation frequency by the UE, the signal satisfying a specific condition.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as web as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 17A and 17B are views illustrating example processing flows in an eNB for acquiring synchronization information between D2D UEs according to this disclosure;

DETAILED DESCRIPTION

Figure 1:
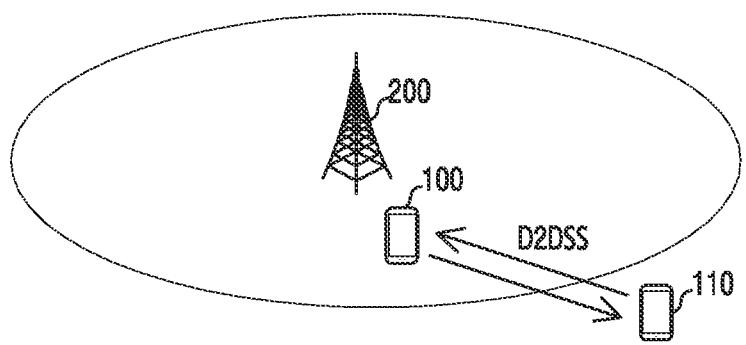
FIG. 1 is a view showing an example operation of acquiring synchronization information between device to device (D2D) user equipments (UEs) according to this disclosure.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device and communication system. Hereinafter, the present disclosure will be described with reference to the accompanying drawings. The present disclosure may have various embodiments, and modifications and changes may be made therein. Therefore, the present disclosure will be described in conjunction with particular embodiments shown in the accompanying drawings. However, it should be understood that there is no intent to limit the present disclosure to the particular forms disclosed herein; rather, the present disclosure should be construed to cover all modifications, equivalents, and/or alternatives falling within the spirit and scope of the disclosure. In the description of the drawings, identical or similar reference numerals are used to designate identical or similar elements.

A D2D terminal or D2D UE is an electronic device having a communication function. For example, the electronic device includes at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (MP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch).

According to some embodiments, the electronic device is a smart home appliance with a communication function. The smart home appliance as an example of the electronic device includes at least one of, for example, a television, a Digital Video Disk (DVD) player, an audio, a refrigerator, an air conditioner, a vacuum cleaner, an oven, a microwave oven, a washing machine, an air cleaner, a set-top box, a TV box (such as, SAMSUNG HOMESYNC™, APPLETV®, or GOOGLETV®), a game console, an electronic dictionary, an electronic key, a camcorder, and an electronic picture frame.

According to some embodiments, the electronic device includes at least one of various medical appliances (such as, magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (such as, ship navigation equipment and a gyrocompass), avionics, security equipment, a vehicle head unit, an industrial or home robot, an automatic teller machine (ATM) of a banking system, and a point of sales (POS) of a shop.

According to some embodiments, the electronic device includes at least one of a part of furniture or a building/ structure having a communication function, an electronic board, an electronic signature receiving device, a projector, and various kinds of measuring instruments (such as, a water meter, an electric meter, a gas meter, a radio wave meter, and the like). The electronic device according to the present disclosure can be a combination of one or more of the aforementioned various devices. Also, the electronic device according to the present disclosure can be a flexible device. Further, it is obvious to those skilled in the art that the electronic device according to the present disclosure is not limited to the aforementioned devices.

Exemplary embodiments of the present disclosure which will be described below relate to an apparatus and a method which detects a D2D synchronization signal (D2DSS) transmitted from at least one neighboring device to device (D2D) user equipment (UE) so that D2D UEs mutually acquire synchronization information, and report the corresponding detected result to an evolved Node B (eNB). In the following description of the embodiments of the present disclosure, "eNB" and "cell" are used interchangeably.

When D2D communication to which the embodiments of the present disclosure are applied fuses with cellular mobile communication, it is possible to increase the traffic accommodation capacity and reduce the overload. When terminals or UEs within the same cell or mutually adjacent cells mutually set a D2D link and then directly transmit and receive data through the D2D link without the intervention of the eNB, it is possible to reduce two links (such as, a link from any one UE to eNB and a link from eNB to another UE) into one link (such as, a link from any one UE to another UE), which results in gaining an advantage. D2D communication is efficiently used even in a situation in which there is no cellular network or the quality of a signal transmitted from the eNB is poor.

The embodiments of the present disclosure include two embodiments. FIGS. 1 to 10 are related to one embodiment of the present disclosure, and FIGS. 11 to 20 are related to the other embodiment thereof.

One embodiment of the present disclosure is based on a situation in which synchronization information should be acquired between D2D UEs belonging to a specific eNB (or cell) and D2D UEs located in an area in which they cannot communicate with an eNB such as a shadow area. In order for the D2D UEs located in the shadow area to communicate with the D2D UE belonging to the eNB, a synchronization process is required, and it is basically necessary that the D2D UEs belonging to the eNB should transmit synchronization signals.

The other embodiment of the present disclosure is based on a situation in which D2D UEs belonging to different eNBs (or cells) should mutually acquire synchronization information. When the D2D UEs set synchronization according to downlink signals of individual eNBs, the D2D UEs belonging to the different eNBs are deviated in synchronization in a case of an asynchronous network in which time synchronization between the eNBs does not fit each other. Thus, in order to receive signals of the D2D UEs belonging to the different eNBs, it is necessary to detect a downlink signal timing of the corresponding eNB or a transmission signal timing of the D2D UEs belonging to the corresponding eNB.

FIG. 1 is a view illustrating an example operation of acquiring synchronization information between D2D UEs according to this disclosure. Referring to FIG. 1, a D2D UE 110 located in an area in which it cannot communicate with an eNB such as a shadow area acquires synchronization information by receiving a D2DSS from a D2D UE 100 belonging to an eNB 200.

As to a basic flow according to one embodiment of the present disclosure as shown in FIGS. 2a to 2d, in operation S210, an eNB (such as the eNB 200) commands the D2D UEs (such as the UE 100) to attempt to detect the D2DSS, and transmits information required for the detection. The D2D UEs belonging to the eNB attempt to detect the corresponding D2DSS in operation S220, and report the corresponding detected result to the eNB in operation S230, as necessary. In operation S240, the eNB commands a specific D2D UE to transmit the D2DSS based on the detected result that has been reported by a large number of D2D UEs. Next, the specific D2D UE transmits the D2DSS to the D2D UEs located in the area in which they cannot communicate with the eNB such as a shadow area. Thus, the D2D UEs located in the area in which they cannot communicate with the acquire synchronization information of the D2D UEs belonging to the eNB, based on the corresponding D2DSS.

FIGS. 2A, 2B, 2C, and 2D are views illustrating example processing flows between the eNB 200 and the D2D UE 100 for an operation of acquiring synchronization information between D2D UEs according to this disclosure. Here, a case in which only a single D2D UE 100 belonging to the eNB 200 performs a D2DSS detection operation is described. However, this is merely for convenience of description, and thus the D2DSS detection operation can be performed by one or more D2D UEs belonging to the eNB 200.

Figure 2A:
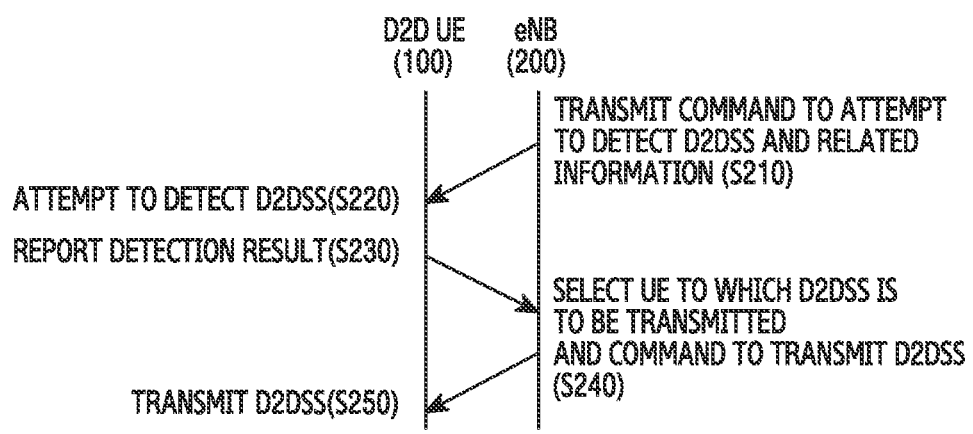
FIGS. 2A, 2B, 2C, and 2D are views illustrating example processing flows between an evolved Node B (eNB) and a UE for an operation of acquiring synchronization information between D2D UEs according to this disclosure.

Referring to FIG. 2A, in operation S210, the eNB 200 transmits a command for attempting to detect a D2DSS and the related information to the D2D UE 100. In operation S220, the D2D UE 100 attempts to detect the D2DSS in response to the command for attempting to detect the D2DSS and the related information which have been transmitted from the eNB 200. In operation S230, the D2D UE 100 reports a D2DSS detection attempt result obtained by attempting to detect the D2DSS, to the eNB 200. In operation S240, the eNB 200 receives the D2DSS detection attempt result from the D2D UE 100, selects a UE to which the D2DSS is to be transmitted based on the received result, and commands the selected UE to transmit the D2DSS. In operation S250, the D2D UE 100 that has received a D2DSS transmission command from the eNB 200 transmits the D2DSS to the D2D UE 110 located in the area in which it cannot communicate with the eNB.

Figure 2B:
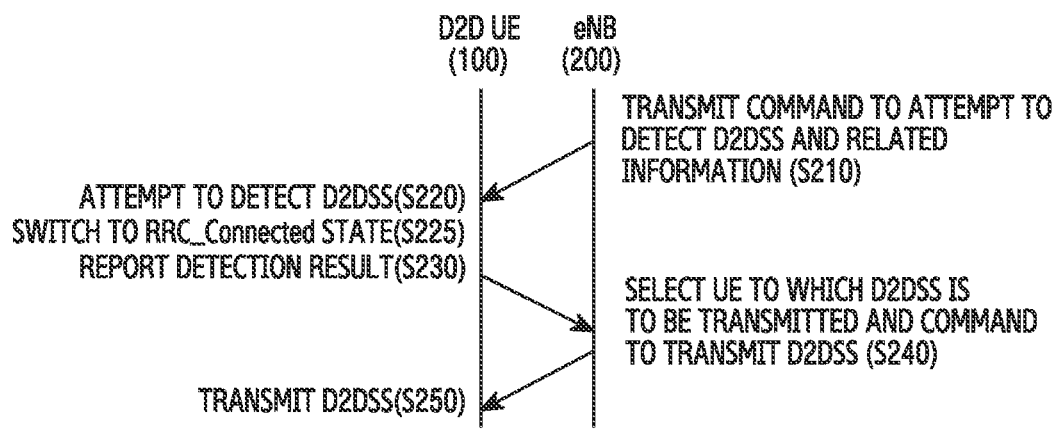

Referring to FIG. 2B, in operation S210, the eNB 200 transmits the command for attempting to detect the D2DSS and the related information to the D2D UE 100. In operation S220, the D2D UE 100 attempts to detect the D2DSS in response to the command for attempting to detect the D2DSS and the related information that has been transmitted from the eNB 200. The D2D UE 100 such as in an RRC_Idle state switches the RRC_Idle state to an RRC_Connected state in operation S225, and reports the D2DSS detection attempt result to the eNB 200 in operation S230. In operation S240, the eNB 200 receives the D2DSS detection attempt result from the D2D UE 100, selects a UE to which the D2DSS is to be transmitted based on the received result, and commands the selected UE to transmit the D2DSS. In operation S250, the D2D UE 100 that has received the D2DSS transmission command from the eNB 200 transmits the D2DSS to the D2D UE 110 located in the area in which it cannot communicate with the eNB.

Figure 2C:
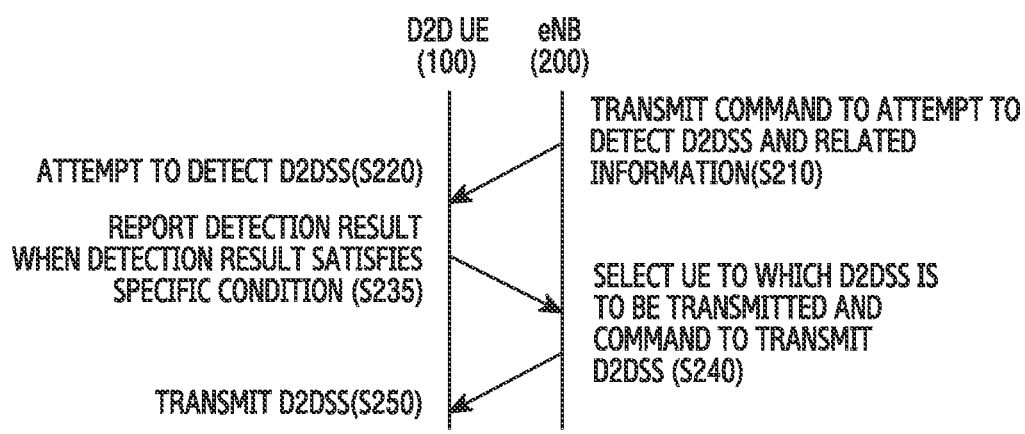

Referring to FIG. 2C, in operation S210, the eNB 200 transmits the command for attempting to detect the D2DSS and the related information to the D2D UE 100. In operation S220, the D2D UE 100 attempts to detect the D2DSS in response to the command for attempting to detect the D2DSS and the related information which have been transmitted from the eNB 200. In operation S235, the D2D UE 100 reports the D2DSS detection attempt result to the eNB 200 when the corresponding result satisfies a specific condition. In operation S240, the eNB 200 receives the D2DSS detection attempt result from the D2D UE 100, selects a UE to which the D2DSS is to be transmitted based on the received result, and commands the selected UE to transmit the D2DSS. In operation S250, the D2D UE 100 that has received a D2DSS transmission command from the eNB 200 transmits the D2DSS to the D2D UE 110 located in the area in which it cannot communicate with the eNB.

Figure 2D:
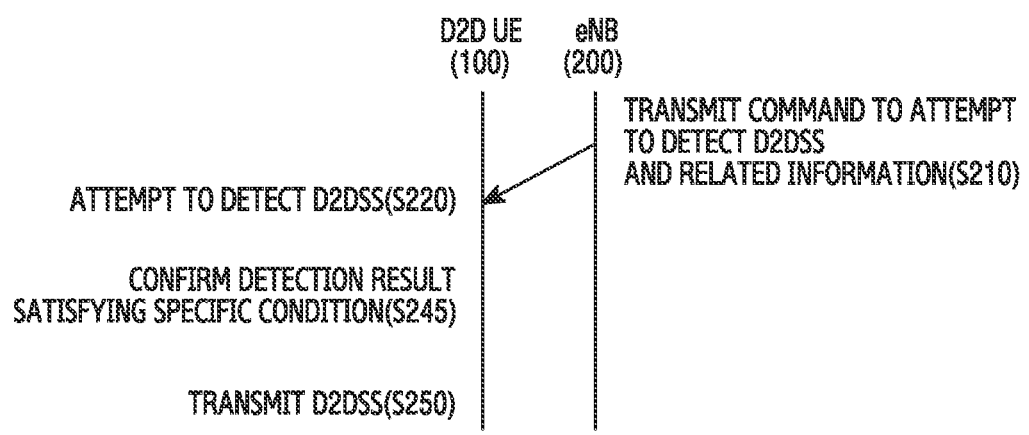

Referring to FIG. 2D, in operation S210, the eNB 200 transmits the command for attempting to detect the D2DSS and the related information to the D2D UE 100. In operation S220, the D2D UE 100 attempts to detect the D2DSS in response to the command for attempting to detect the D2DSS and the related information which have been transmitted from the eNB 200. The D2D UE 100 confirms a D2DSS detection result that satisfies the specific condition in operation S245, and transmits the D2DSS to the D2D UE 110 located in the area in which it cannot communicate with the eNB in operation S250.

Hereinafter, the operations shown in FIGS. 2A to 2D will be specifically discussed. Here, a case in which the D2DSS detection operation is performed by a single D2D UE 100 is shown, but this is merely for convenience of description. For example, the D2DSS detection operation is performed by one or more D2D UEs 100.

In operation S210, the eNB 200 commands the D2D UEs 100 belonging to the corresponding eNB to attempt to detect the D2DSS. Information concerning that a shadow area is present in a place adjacent to the corresponding eNB or the adjacent eNB is not properly operated is transmitted to the corresponding eNB 200 via a network, and the eNB 200 issues a command for attempting to detect the D2DSS based on the transmitted information. According to an embodiment, the command for attempting to detect the D2DSS is issued to all of the D2D UEs which are in the RRC_Idle state and the RRC_Connected state in a broadcast manner. According to another embodiment, the command for attempting to detect the D2DSS is issued only to a specific D2D UE in a dedicated manner. According to still another embodiment, the command for attempting to detect the D2DSS is issued only to UEs that satisfy the specific condition. For example, the eNB 200 commands, to attempt to detect the D2DSS, only the D2D UEs whose signal strength such as RSRP (Reference Signal Received Power) of the serving cell is smaller than a specific threshold value.

Figure 3A:
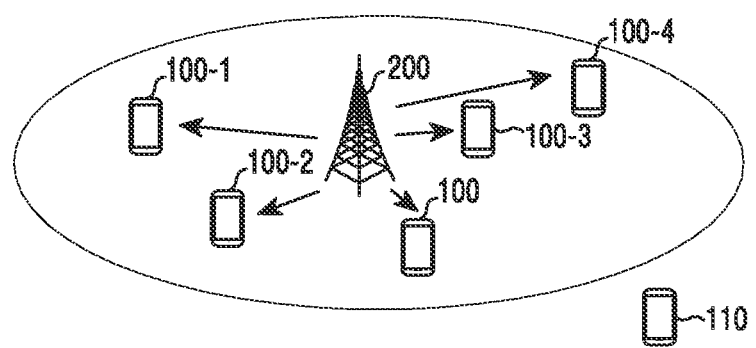
FIGS. 3A and 3B are views illustrating an example operation of transmitting a command for attempting to detect a D2D synchronization signal (D2DSS) and the related information from an eNB to a UE according to this disclosure.
Figure 3B:
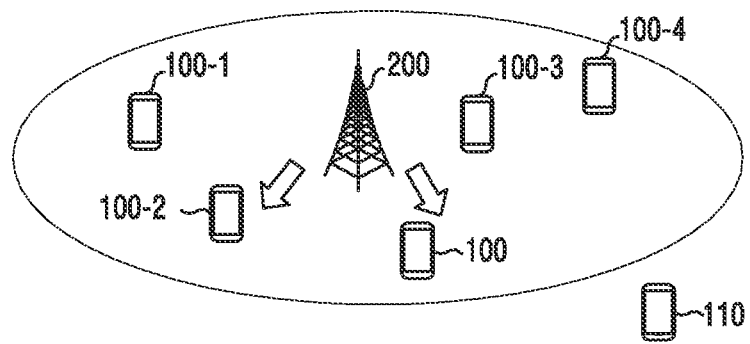

FIGS. 3A and 3B are views illustrating an example operation of transmitting a command for attempting to detect a D2DSS and the related information from an eNB to a UE according to this disclosure. Referring to FIG. 3A, the eNB 200 issues the command for attempting to detect the D2DSS to all of the D2D UEs 100 (100-1, 100-2, 100-3, and 100-4) in a broadcast manner. Referring to FIG. 3B, the eNB 200 issues the command for attempting to detect the D2DSS only to the specific D2D UE 100 (100-2). The specific D2D UE 100 (100-2) is a dedicatedly set UE or a UE that satisfies the specific condition.

Referring again to operation S210, the eNB 200 provides the D2DSS detection-related information to the D2D UE 100. A detection condition for the D2DSS is determined based on an absolute or relative signal strength (RSSI (Received Signal Strength Indicator), RSRP, or the like). According to an embodiment, when issuing the command for attempting to detect the D2DSS, the eNB 200 notifies the D2D UEs of the corresponding detection condition. According to another embodiment, the detection condition is promised in advance between the eNB 200 and the UE 100.

In operation S220, the D2D UEs 100 that have received the command for attempting to detect the D2DSS attempts to detect the D2DSS. For such detection operation, the eNB 200 notifies in advance the UEs of information about D2D communication frequencies or operation frequencies through a control message (such as an RRC (Radio Resource Control) message) or system information. In this instance, frequencies used by the D2D UEs belonging to the eNB and the D2D frequencies used by UEs located in the area in which they cannot communicate with the eNB such as the shadow area are different from each other, and the eNB notifies all of the UEs of the corresponding information. A UE in which one reception chain is provided and that currently communicates with a serving eNB is difficult to detect the D2DSS. In this case, the eNB 200 allocates a measurement gap to the UE through the RRC message or the like. For example, in the corresponding measurement gap, the UE is allowed to prevent transmission and reception of signals with the serving eNB.

Figure 4A:
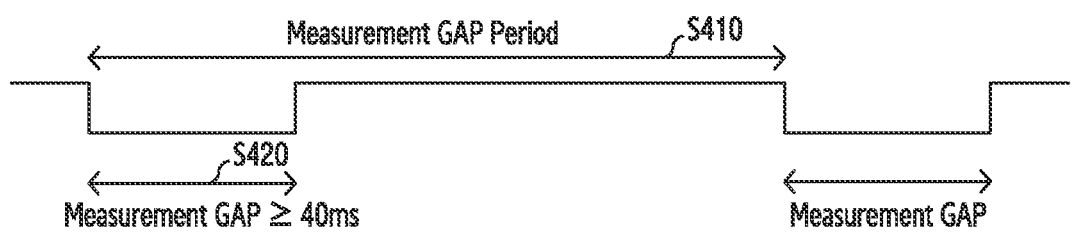
FIGS. 4A, 4B, and 4C are views illustrating example patterns of a measurement gap for a D2DSS detection operation in a UE according to this disclosure.
Figure 4B:
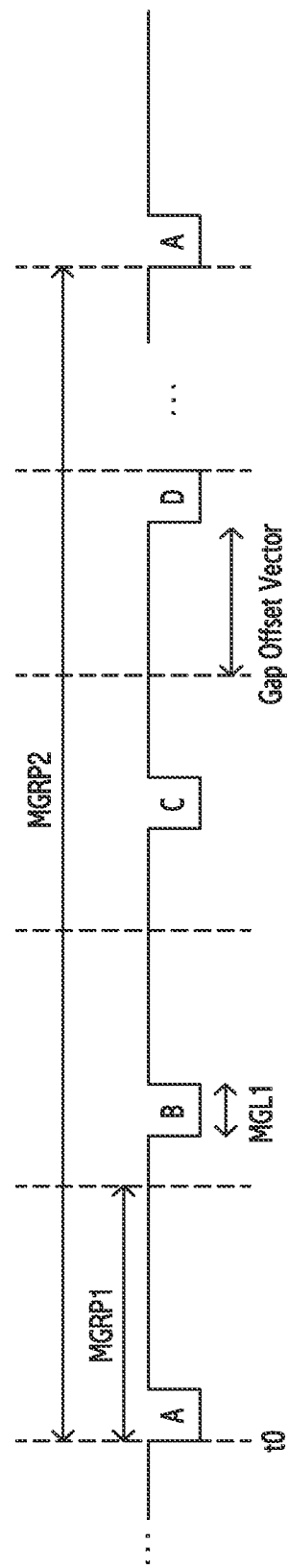
Figure 4C:
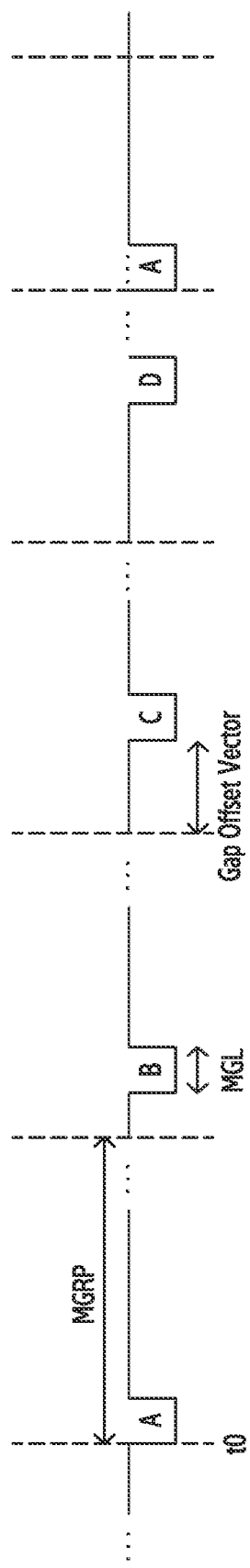

FIGS. 4A, 4B, and 4C are views illustrating example patterns of a measurement gap for a D2DSS detection operation in a UE according to this disclosure. Referring to FIG. 4A, a pattern for a measurement gap S420 is given to be longer than a period of the D2DSS. For example, when the period of the D2DSS is 40 ms, the measurement gap S420 is set as 41 ms, 42 ms, or the like such as larger than 40 ms. The eNB 200 can set a time when the measurement gap starts and a measurement gap period S410, and implicitly or explicitly notify the UE of the set information. For example, it is possible to define a gap pattern ID that sets an MGL (Measurement Gap Length) as 41 ms and an MGRP (Measurement Gap Repetition Period) T ms, and the eNB commands to set the measurement gap through the gap pattern ID and a gap offset. However, when the period of the D2DSS becomes longer, a problem occurs in that the measurement gap that does not communicate with the serving cell is increased. Such problem can be solved using patterns shown in FIGS. 4B and 4C.

Referring to FIG. 4B, the pattern for the measurement gap is given to be shorter than the period of the D2DSS. For example, when the period of the D2DSS is 40 ms, a sum (A+B+C+D) of each short measurement gap MGL 1 is set to be larger than 40 ms. A time when each short measurement gap starts, such as, a gap offset vector such as a time offset vector for each of A, B, C, and D is [0, 2, 3] (corresponding unit is MGL1), and the eNB 200 sets the gap offset vector in advance or commands the UE to set the gap offset vector within a predetermined configuration. In addition, the eNB 200 can also set a time t0 when the measurement gap with respect to the whole of A, B, C, and D starts and a measurement gap period MGRP 2, and notify the UE of the set information.

As shown in FIG. 4C, a pattern for the measurement gap is given. For example, when the period of the D2DSS is 40 ms, a sum (A+B+C+D) of each short measurement gap MGL is set to be larger than 40 ms. A gap offset vector such as a time offset for a time when each short measurement gap starts, such as, each of A, B, C, and D is [0, 1, 2, 3] (corresponding unit is MGL), and the eNB 200 sets the gap offset vector in advance or commands the UE to set the gap offset vector within a predetermined configuration. The eNB 200 can also set a time t0 When the measurement gap A starts and a measurement gap period MGRP, and notify the UE of the set information. According to an embodiment, the MGRP is set in units of multiples of the period of the D2DSS of 40 ms.

The method shown in FIGS. 4B and 4C can solve the problem in that the measurement gap that does not communicate with the cell is increased, by dispersing the measurement gap that does not communicate with the serving cell, but a time required for measurement is increased. Thus, it may be necessary to set a time of the short measurement gap according to requirements.

Figure 5:
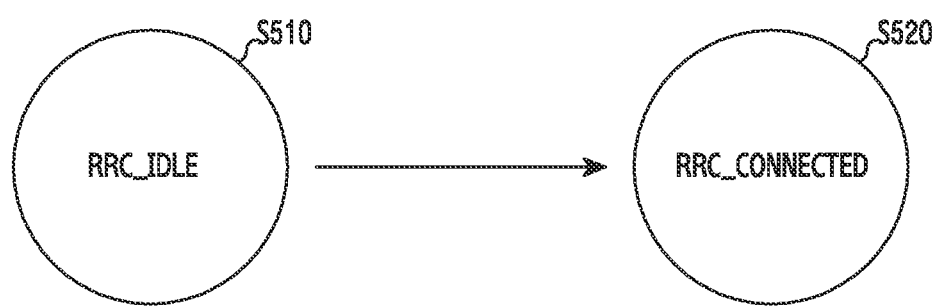
FIG. 5 is a view illustrating an example state transition operation for reporting a D2DSS detection result in a UE according to this disclosure.

In operation S230, the D2D UEs report the D2DSS detection result to the eNB 200. The D2D UEs which are currently in the RRC_Idle state S510 perform an RRC connection establishment process for the transition to the RRC_Connected state S520. For example, the UE enters a mode (or state) that reports the corresponding result to the eNB. In operation S225, the D2 UEs such as in the RRC_Idle state S510 is switched to the RRC_Connected state S520 as illustrated in FIG. 5.

In operation S235, only when the D2DSS detection result satisfies the specific condition even though the D2DSS is detected, the D2D UEs reports the D2DSS detection result to the eNB 200. Such specific condition can be requested in advance by the eNB 200, and include the contents of the following Table 1.

TABLE 1

(1) a case in which the reception signal strength of the D2DSS transmitted from the D2D UE located in the area in which it cannot communicate with the eNB such as the shadow area is larger than a specific threshold value, or a case in which at least two of such signals are detected
(2) a case in which the reception signal strength of the D2DSS transmitted from the D2D UE that communicates with the eNB is larger than a specific threshold value, or a case in which at least two of such signals are detected
(3) a case in which the signal strength (such as RSRP (Reference Signal Received Power), RSRQ (Reference Signal Received Quality), SINR(Signal to Interference plus Noise Ratio), or the like) of the serving cell signal is smaller than a specific threshold value In operation S230 or operation S235, the D2D UEs report the D2DSS detection result to a serving cell, such as, the eNB 200. The detection result reported to the eNB 200 includes the contents of the following Table 2.

TABLE 2

(1) the number, a sequence index (identifier), a signal strength, or the like of the D2DSSs transmitted from the D2D UE located in the area in which it cannot communicate with the eNB such as a shadow area
(2) the number, a sequence index (identifier), a signal strength, or the like of the D2DSS transmitted from the D2D UE that communicates with the eNB
(3) signal strength of serving cell signal
(4) battery level of the UE In operation S240, the eNB 200 selects the specific UE to which the D2DSS is to be transmitted based on the detected result that has been reported in operation S230 or operation S235, and commands the selected specific UE to transmit the D2DSS. In operation S250, the specific UE that has received the D2DSS transmission command from the eNB 200 transmits the D2DSS. The transmission of the D2DSS is performed without the command from the eNB 200. For example, in operation S245, the UE that has confirmed the detected result that satisfies the condition requested by the eNB 200 transmits the D2DSS without an additional command of the eNB in operation S250.

The eNB 200 commands the UEs selected for D2DSS transmission to periodically report the detected result, and thereby continuously update and manage a pool of the D2D UE that transmits the D2DSS. The eNB 200 preferentially commands, to transmit the D2DSS, the UE (such as 100) that has detected that the strength and the number of the D2DSSs transmitted from the D2D UE that communicates with the eNB 200 are larger than those of the D2DSSs transmitted from the D2D UE (such as 110) located in the area in which it cannot communicate with the eNB 200 such as the shadow area. The eNB 200 commands, to transmit the D2DSS, user located in a cell boundary in which no D2DSS is detected. When there are a plurality of UEs that have detected that the strength of the D2DSS transmitted from the D2D UE that communicates with the eNB 200 is larger than that of the D2DSS transmitted from the D2D UE located in the area in which it cannot communicate with the eNB 200, the eNB 200 commands some of the plurality of UEs to interrupt the D2DSS transmission. In addition, the eNB 200 commands, to interrupt the D2DSS transmission, some of the D2D UEs that have reported that sequence indexes of the D2DSSs transmitted from the D2D UEs located in the area in which they cannot communicate with the eNB 200 such as the shadow area are the same.

The D2D UE located in the area in which it cannot communicate with the eNB such as the shadow area sets synchronization based on the corresponding D2DSS when detecting the D2DSS transmitted from the UE that communicates with the eNB. Next, the D2D UE located in the area in which it cannot communicate with the eNB acquires transmittable resource pool configuration information and receivable resource pool configuration information based on D2D resource pool information signal or D2D Synchronization Channel (hereinafter, referred to as "D2DSCH") transmitted from the UE that communicates with the eNB. Transmission and reception resource pools can be equal to each other, or the reception resource pool can include the transmission resource pool. For example, when the D2D resource pool that is currently operated within the eNB is a type of the D2D resource pool which the eNB allocates to the D2D UE in a dedicated manner, the eNB additionally allocates a contention-based D2D resource pool. The resource pools of two types are subjected to Time Division Multiplexing (TDM) or Frequency Division Multiplexing (FDM). The UE that cannot communicate with the eNB acquires the corresponding information through the D2DSCH transmitted from the UE that communicates with the eNB, transmits the corresponding information only to the contention-based D2D resource pool, and receives the corresponding information from both the resource pools of two types.

Figure 6:
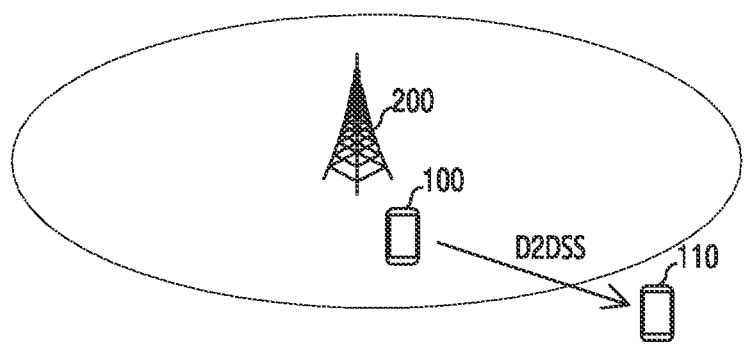
FIG. 6 is a view illustrating an example operation of transmitting a D2DSS by a UE selected in an eNB according to this disclosure.

FIG. 6 is a view illustrating an example operation of transmitting a D2DSS by a UE selected in an eNB according to this disclosure. Referring to FIG. 6, the UE 100 transmits the D2DSS to the UE 110. According to an embodiment, the eNB 200 selects the UE 100 to which the D2DSS is to be transmitted based on the reported detection result, and commands the selected UE 100 to transmit the D2DSS. Next, the UE 100 transmits the D2DSS to the UE 110. According to another embodiment, the UE 100 that has confirmed the detection result that satisfies the condition requested by the eNB 200 transmits the D2DSS to the UE 110 without a D2DSS transmission command from the eNB 200.

Figure 7A:
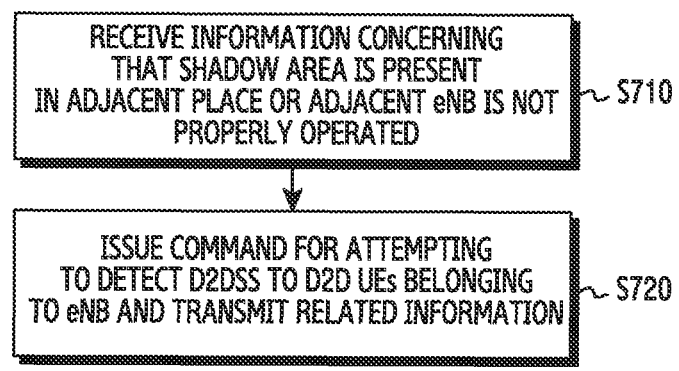
FIGS. 7A and 7B are views illustrating example processing flows in an eNB for acquiring synchronization information between D2D UEs according to this disclosure.
Figure 7B:
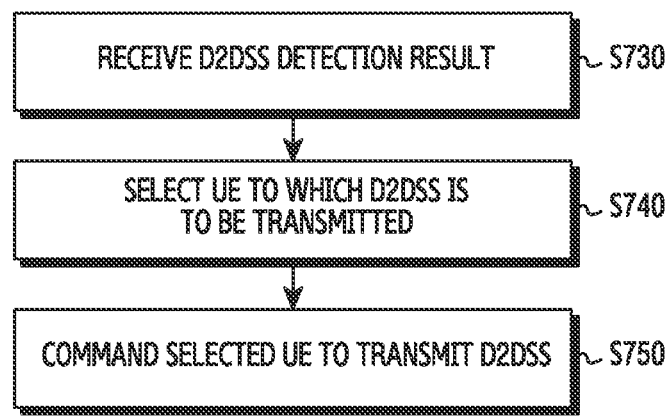

FIGS. 7A and 7B are views showing processing flows in an eNB for acquiring synchronization information between D2D UEs according to this disclosure. These processing flows can be performed by the eNB 200 shown in FIG. 1. Referring to FIG. 7A, in operation S710, the eNB 200 receives information concerning that a shadow area is present in a place adjacent to the corresponding eNB or the adjacent eNB is not properly operated, via a network. In operation S720, the eNB 200 issues a command for attempting to detect the D2DSS to the D2D UEs belonging to the eNB 200. According to an embodiment, the command for attempting to detect the D2DSS is issued to all of the D2D UEs belonging to the eNB 200 in a broadcast manner. According to another embodiment, the command for attempting to detect the D2DSS is issued only to a dedicated UE among the D2D UEs belonging to the eNB 200. According to still another embodiment, the command for attempting to detect the D2DSS is issued only to a UE that satisfies a specific condition among the D2D UEs belonging to the eNB 200. For example, the specific condition is a case in which the signal strength of the serving cell is smaller than a specific threshold value.

In addition, in operation S720, the eNB 200 transmits D2DSS detection-related information to the D2D UEs belonging to the eNB 200. According to an embodiment, the D2DSS detection-related information includes information about a D2D communication frequency or an operation frequency. According to another embodiment, the D2DSS detection-related information includes information about a measurement gap for D2DSS detection. The D2DSS detection-related information is provided through an RRC message or system information. Such D2DSS detection-related information is provided to the D2D UEs in advance before the command for attempting to detect the D2DSS is provided.

Referring to FIG. 7B, in operation S730, the eNB 200 receives a D2DSS detection result. According to an embodiment, the D2DSS detection result includes information about the number, a sequence index, and strength of the D2DSSs transmitted from the D2D located in the area in which it cannot communicate with the eNB, and information about the number, a sequence index, and strength of the D2DSSs transmitted from the D2D UE that communicates with the eNB. According to another embodiment, the D2DSS detection result further includes information about the strength of servicing cell signals. According to still another embodiment, the D2DSS detection result further includes information about a battery level of the UE.

In operation S740, the eNB 200 selects a UE to which the D2DSS is to be transmitted based on the received D2DSS detection result. According to an embodiment, the eNB 200 selects a UE proximity to the UE located in the area in which it cannot communicate with the eNB such as the shadow area while being located in a cell boundary, among the UEs belonging to the area of the eNB 200. In operation S750, the eNB 200 commands the selected UE to transmit the D2DSS.

Figure 8A:
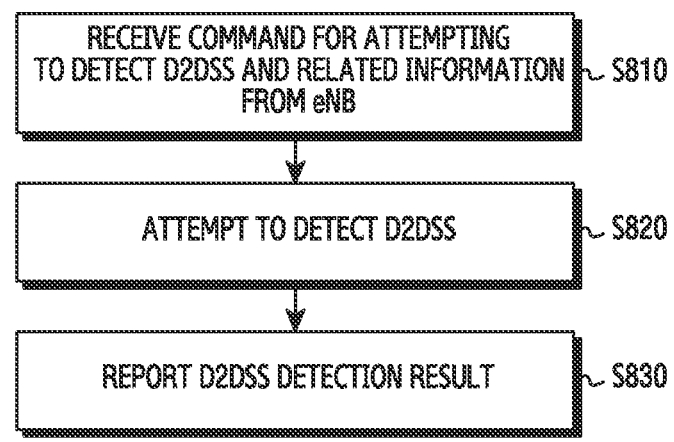
FIGS. 8A, 8B, and 8C are views illustrating example processing flows of a D2DSS detection operation in a D2D UE according to this disclosure.
Figure 8B:
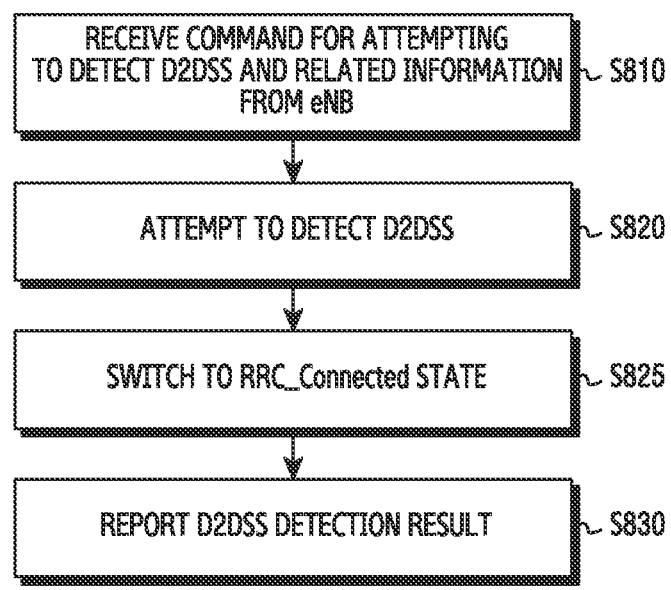
Figure 8C:
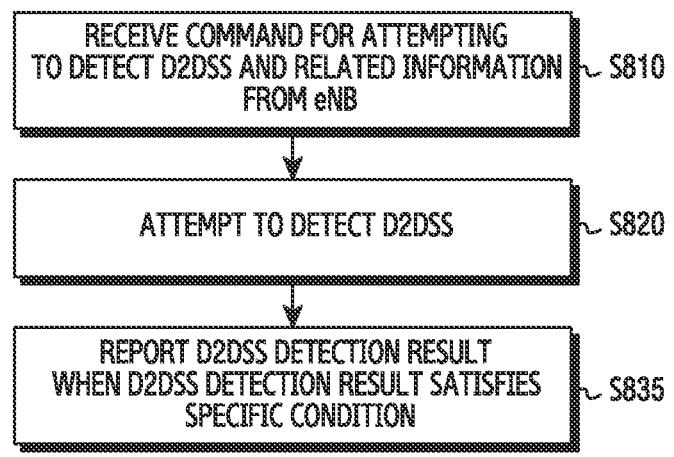

FIGS. 8A, 8B, and 8C are views illustrating example processing flows of a D2DSS detection operation in a D2D UE according to this disclosure. These processing flows can be performed by the D2D UE 100 shown in FIG. 1.

Referring to FIG. 8A, in operation S810, the D2D UE 100 receives the command for attempting to detect the D2DSS from the eNB 200. According to an embodiment, the command for attempting to detect the D2DSS is issued to all of the D2D UEs belonging to the eNB 200 in a broadcast manner. According to another embodiment, the command for attempting to detect the D2DSS is issued only to a dedicated UE among the D2D UEs belonging to the eNB 200. According to still another embodiment, the command for attempting to detect the D2DSS is issued only to a UE that satisfies a specific condition among the D2D UEs belonging to the eNB 200. For example, the specific condition is a case in which the signal strength of the serving cell is smaller than a specific threshold value.

In addition, in operation S810, the D2D UE 100 receives D2DSS detection-related information from the eNB 200. According to an embodiment, the D2DSS detection-related information includes information about a. D2D communication frequency or an operation frequency. According to another embodiment, the D2DSS detection-related information includes information about a measurement gap for D2DSS detection. The D2DSS detection-related information is provided through an RRC message or system information. Such D2DSS detection-related information is received in advance before the command for attempting to detect the D2DSS is received.

In operation S820, the D2D UE 100 attempts to detect the D2DSS in response to the received command for attempting to detect the D2DSS. In operation S830, the D2D UE 100 reports a D2DSS detection result to the eNB 200. According to an embodiment, the D2DSS detection result includes information about the number, a sequence index, and strength of the D2DSSs transmitted from the D2D UE located in the area in which it cannot communicate with the eNB, and information about the number, a sequence index, and strength of the D2DSSs transmitted from the D2D UE that communicates with the eNB. According to another embodiment, the D2DSS detection result further includes information about the strength of servicing cell signals. According to still another embodiment, the D2DSS detection result further includes information about a battery level of the UE.

Referring to FIG. 8B, in operation S810, the D2D UE 100 receives, from the eNB 200, the command for attempting to detect the D2DSS and D2DSS detection attempt-related information. In operation S820, the D2D UE 100 attempts to detect the D2DSS in response to the received command for attempting to detect the D2DSS. In operation S825, the D2D UE 100 that is currently in an RRC_Idle state switches from the RRC_Idle state to an RRC_Connected state in which the corresponding detection result is reported to the eNB, by performing an RRC connection establishment process. In operation S830, the D2D UE 100 reports a D2DSS detection result to the eNB 200.

Referring to FIG. 8C, in operation S810, the D2D UE 100 receives, from the eNB 200, the command for attempting to detect the D2DSS and the D2DSS detection attempt-related information. In operation S820, the D2D UE 100 attempts to detect the D2DSS in response to the received command for attempting to detect the D2DSS. In operation S835, the D2D UE 100 reports the D2DSS detection result to the eNB 200 only when the D2DSS detection result satisfies the specific condition. Such specific condition is provided by the eNB 200 in advance. According to an embodiment, the specific condition includes a case in which the reception signal strength of the D2DSS transmitted from the D2D UE located in the area in which it cannot communicate with the eNB such as the shadow area is larger than a specific threshold value, or a case in which at least two of such signals are detected. According to another embodiment, the specific condition includes a case in which the reception signal strength of the D2DSS transmitted from the D2D UE that communicates with the eNB is larger than a specific threshold value, or a case in which at least two of such signals are detected. According to still another embodiment, the specific condition includes a case in which the signal strength (such as Reference Signal Received Power (RSRP), Reference Signal Received Quality (RSRQ), Signal to interference plus Noise Ratio (SINR), or the like) of the serving cell signals is smaller than a specific threshold value. According to yet another embodiment, the specific condition includes a combination of the above-mentioned conditions.

Figure 9A:
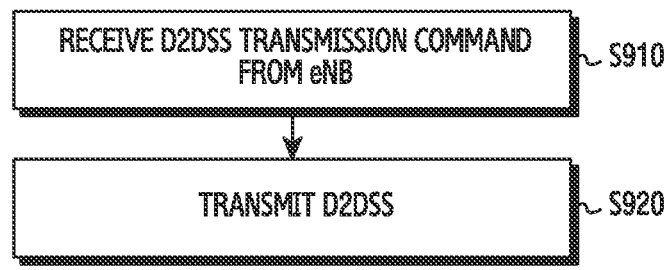
FIGS. 9A and 9B are views illustrating example processing flows of a D2DSS transmission operation in a D2D UE according to this disclosure.
Figure 9B:
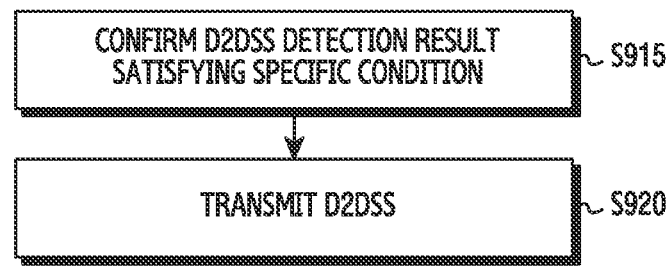

FIGS. 9A and 9B are views illustrating example processing flows of a D2DSS transmission operation in a D2D UE according to this disclosure. These processing flows can be performed by the D2D UE 100 shown in FIG. 1. In this instance, the D2D UE 100 is a UE that is selected by the eNB 200 based on the D2DSS detection result. Referring to FIG. 9A, in operation S910, the D2D UE 100 receives a D2DSS transmission command from the eNB 200. In operation S920, the D2D UE 100 transmits the D2DSS to the UE 110 in response to the received D2DSS transmission command. Referring to FIG. 9B, in operation S915, the D2D UE 100 determines whether the D2DSS detection result satisfies a specific condition. In operation S920, when it is determined that the D2DSS detection result satisfies the specific condition, the D2D UE 100 transmits the D2DSS to the UE 110.

Figure 10:
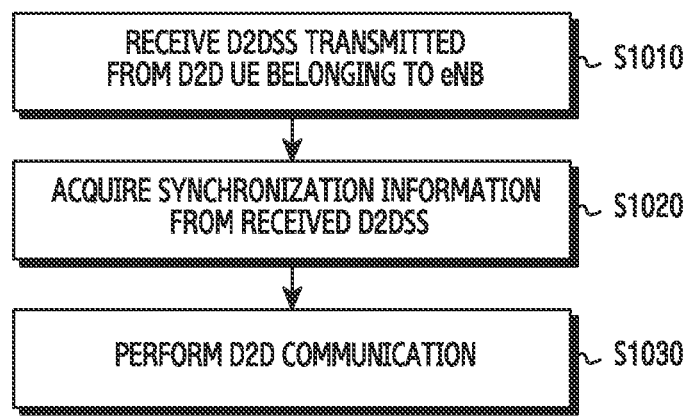
FIG. 10 is a view illustrating an example processing flow of an operation of acquiring synchronization information between D2D UEs according to this disclosure.

FIG. 10 is a view illustrating an example processing flow of an operation of acquiring synchronization information between D2D UEs according to this disclosure. This processing flow can be performed by the D2D UE 110 shown in FIG. 1. Referring to FIG. 10, in operation S1010, the D2D UE 110 receives the D2DSS transmitted from the D2D UE 100 belonging to the eNB. In operation S1020, the D2D UE 110 acquires synchronization information from the received D2DSS. In operation S1030, the D2D UE 110 performs D2D communication with the D2D UE 100 belonging to the eNB using the acquired synchronization information.

Figure 11:
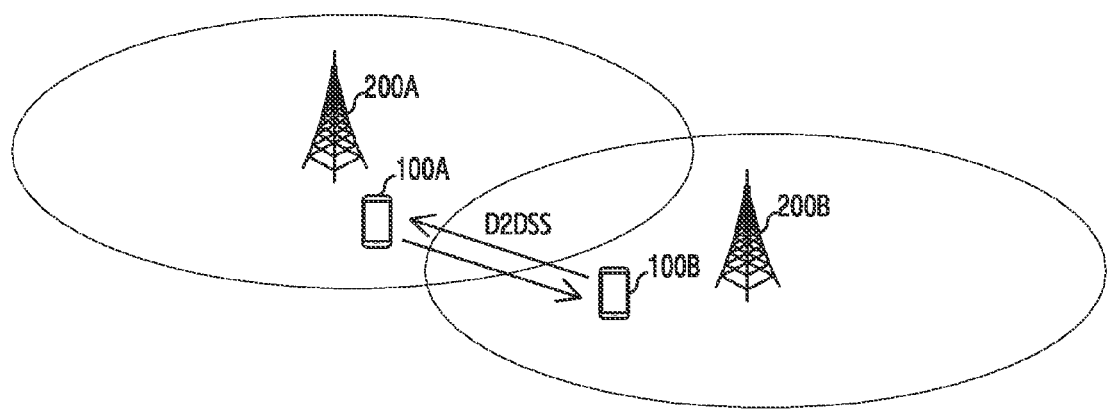
FIG. 11 is a view illustrating an operation of acquiring synchronization information between D2D UEs according to this disclosure.

FIG. 11 is a view showing an operation of acquiring synchronization information between D2D UEs according to another exemplary embodiment of the present disclosure. Referring to FIG. 11, D2D UEs 100A and 100B which belong to asynchronous eNBs (or cells) different from each other mutually acquire synchronization information. For example, the D2D UE 100A belonging to an eNB 200A receives the D2DSS such as a D2D synchronization signal from the D2D UE 100B belonging to an eNB 200B adjacent to the eNB 200A, thereby acquiring the synchronization information. By way of another example, the D2D UE 100B belonging to the eNB 200B receives the D2DSS such as the D2D synchronization signal from the D2D UE 100A belonging to the adjacent eNB 200A, thereby acquiring the synchronization information.

As to a basic flow according to this disclosure as shown in FIGS. 12A, 12B, 12C, and 12D, in operation S1210, an eNB (such as the eNB 200A) commands D2D UEs (such as the UE 100A) to attempt to detect the D2DSS, and transmits information required for the detection. The D2D UEs belonging to the eNB attempt to detect the corresponding D2DSS in operation S1220, and report the corresponding detected result to the eNB in operation S1230, as necessary. In operation S1240, the eNB commands a specific D2D UE to transmit the D2DSS based on the detected result that has been reported by a large number of D2D UEs. When failing to detect a cellular synchronization signal (SS) transmitted from the adjacent eNB, the D2D UEs acquires synchronization information of the D2D UEs belonging to the adjacent eNB based on the D2DSS transmitted from the UE belonging to the adjacent eNB.

FIGS. 12A, 12B, 12C, and 12D are views illustrating example processing flows between the eNB 200A and the D2D UE 100A for an operation of acquiring synchronization information between D2D UEs according to this disclosure. Here, a case in which only a single D2D UE 100A belonging to the eNB 200A performs the D2DSS detection operation is described. However, this is merely for convenience of description, and thus the D2DSS detection operation is performed by one or more D2D UEs belonging to the eNB 200A.

Figure 12A:
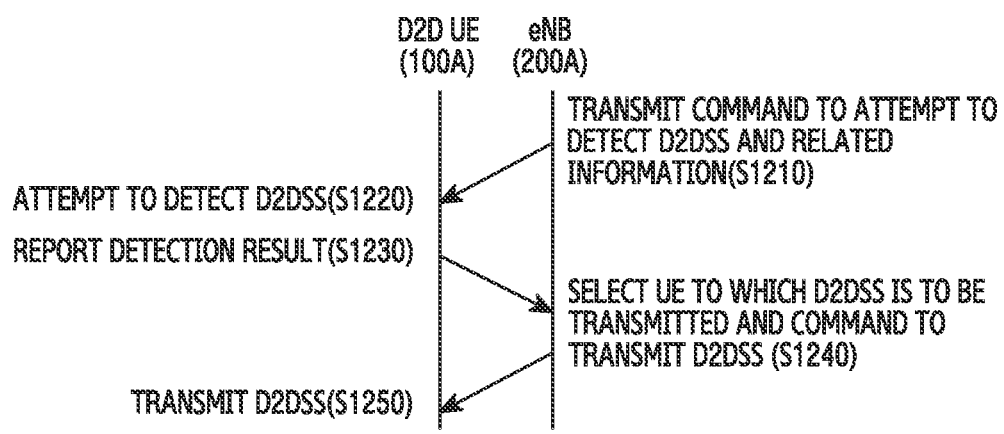
FIGS. 12A, 12B, 12C, and 12D are views illustrating example processing flows between an eNB and a UE for an operation of acquiring synchronization information between D2D UEs according to this disclosure.

Referring to FIG. 12A, in operation S1210, the eNB 200A transmits a command for attempting to detect the D2DSS and the related information to the D2D UE 100A. In operation S1220, the D2D UE 100A attempts to detect the D2DSS in response to the command for attempting to detect the D2DSS and the related information which have been transmitted from the eNB 200A. In operation S1230, the D2D UE 100A reports a D2DSS detection attempt result to the eNB 200A. In operation S1240, the eNB 200A receives the D2DSS detection attempt result from the D2D UE 100A, selects a UE to which the D2DSS is to be transmitted based on the received result, and commands the selected UE to transmit the D2DSS. In operation S1250, the D2D UE 100A that has received a D2DSS transmission command from the eNB 200A transmits the D2DSS to the D2D UE 100B that belongs to the eNB 200B.

Figure 12B:
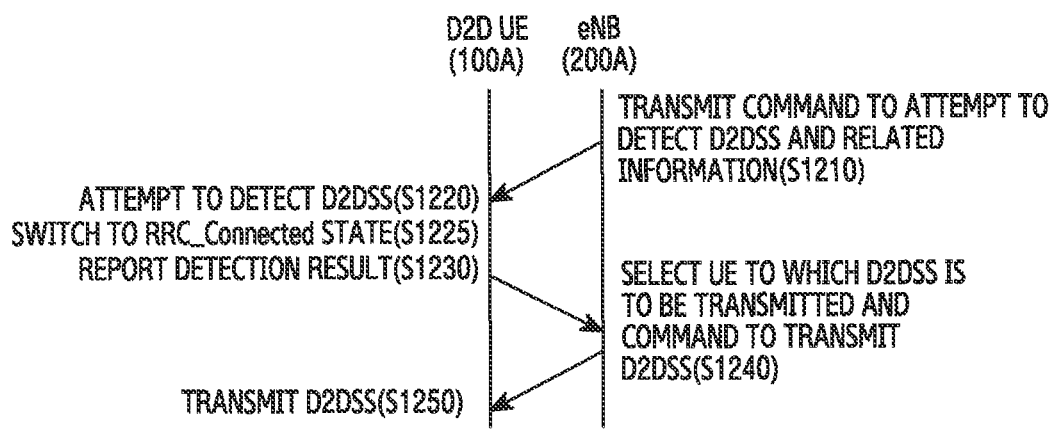

Referring to FIG. 12B, in operation S1210, the eNB 200A transmits the command for attempting to detect the D2DSS and the related information to the D2D UE 100A. In operation S1220, the D2D UE 100A attempts to detect the D2DSS in response to the command for attempting to detect the D2DSS and the related information that has been transmitted from the eNB 200A. The D2D UE 100A that is in an RRC_Idle state switches from the RRC_Idle state to an RRC_Connected state in operation S1225, and reports the D2DSS detection attempt result to the eNB 200A in operation S1230. In operation S1240, the eNB 200A receives the D2DSS detection attempt result from the D2D UE 100A, selects a UE to which the D2DSS is to be transmitted based on the received result, and commands the selected UE to transmit the D2DSS. In operation S1250, the D2D UE 100A that has received the D2DSS transmission command from the eNB 200A transmits the D2DSS to the D2D UE 110B that belongs to the eNB 200B.

Figure 12C:
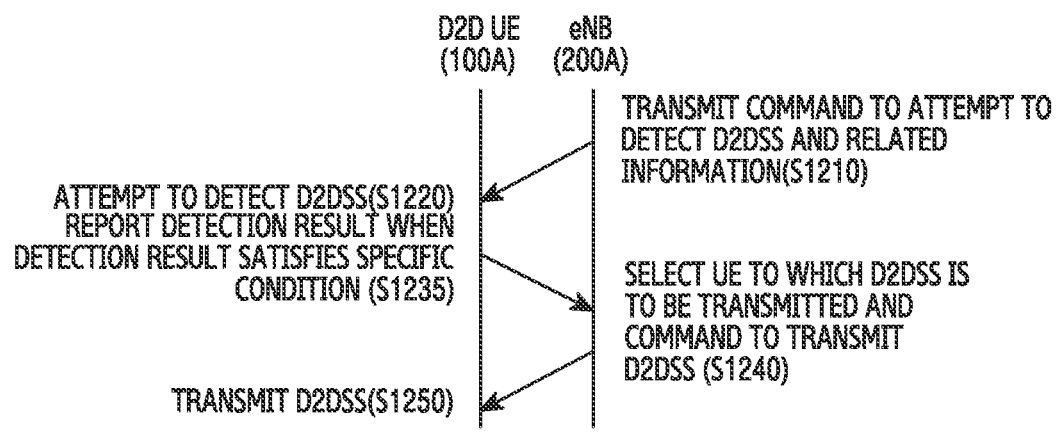

Referring to FIG. 12C, in operation S1210, the eNB 200A transmits the command for attempting to detect the D2DSS and the related information to the D2D UE 100A. In operation S1220, the D2D UE 100A attempts to detect the D2DSS in response to the command for attempting to detect the D2DSS and the related information which have been transmitted from the eNB 200A. In operation S1235, the D2D UE 100A reports the D2DSS detection attempt result to the eNB 200A when the corresponding result satisfies a specific condition. In operation S1240, the eNB 200A receives the D2DSS detection attempt result from the D2D UE 100A, selects a UE to which the D2DSS is to be transmitted based on the received result, and commands the selected UE to transmit the D2DSS. In operation S1250, the D2D UE 100A that has received a D2DSS transmission command from the eNB 200A transmits the D2DSS to the D2D UE 100B that belongs to the eNB 200B.

Figure 12D:
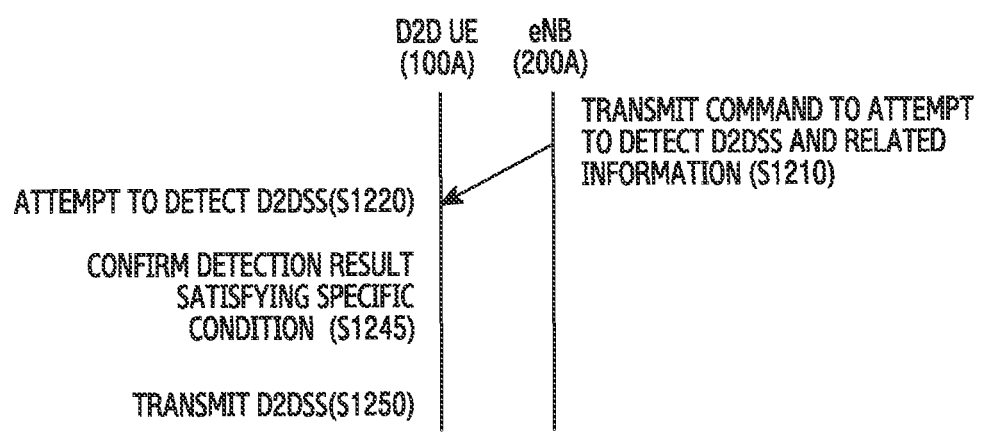

Referring to FIG. 12D, in operation S1210, the eNB 200A transmits the command for attempting to detect the D2DSS and the related information to the D2D UE 100A. In operation S1220, the D2D UE 100A attempts to detect the D2DSS in response to the command for attempting to detect the D2DSS and the related information which have been transmitted from the eNB 200A. The D2D UE 100A confirms a D2DSS detection result that satisfies the specific condition in operation S1245, and transmits the D2DSS to the D2D UE 100B that belongs to the eNB 200B in operation S1250.

Hereinafter, the operations shown in FIGS. 12A to 12D will be specifically discussed. Here, a case in which the D2DSS detection operation is performed by a single D2D UE 100A is shown, but this is merely for convenience of description. For example, the D2DSS detection operation is performed by one or more D2D UEs.

In operation S1210, the eNB 200A commands the D2D UE 100A belonging to the corresponding eNB to attempt to detect the D2DSS. Here, the D2DSS is a signal transmitted from the D2D UE belonging to a serving eNB. According to an embodiment, the command for attempting to detect the D2DSS is issued to all of the D2D UEs which are in the RRC_Idle state and the RRC_Connected state in a broadcast manner. According to another embodiment, the command for attempting to detect the D2DSS is issued only to a specific D2D UE in a dedicated manner. According to still another embodiment, the command for attempting to detect the D2DSS is issued only to UEs that satisfy the specific condition. For example, the eNB 200A commands, to attempt to detect the D2DSS, only the D2D UEs whose signal strength such as RSRP of the serving cell is smaller than a specific threshold value.

Figure 13A:
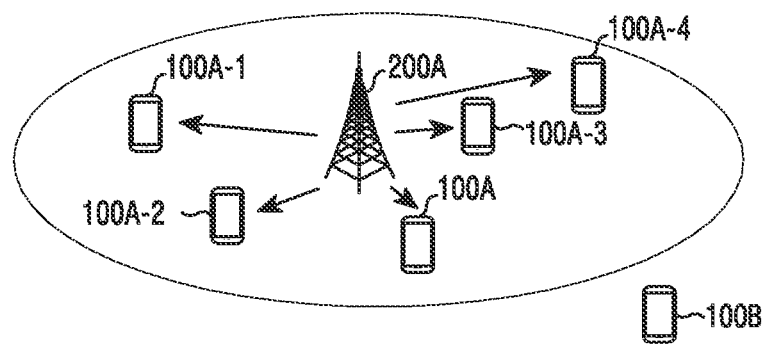
FIGS. 13A and 13B are views illustrating an operation of transmitting a command for attempting to detect a D2DSS and the related information from an eNB to a UE according to this disclosure.
Figure 13B:
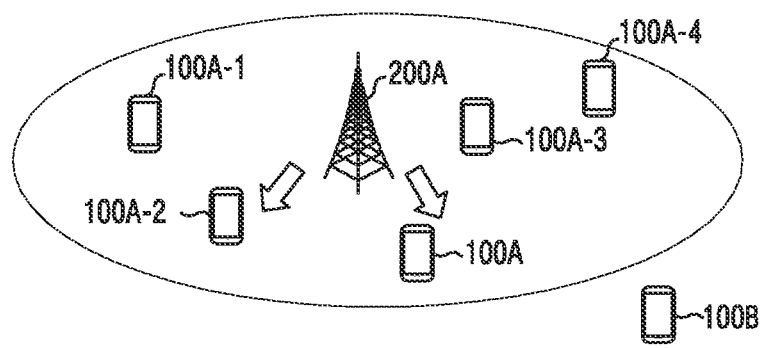

FIGS. 13A and 13B are views illustrating an example operation of transmitting a command for attempting to detect a D2DSS and the related information from an eNB to a UE according to this disclosure. Referring to FIG. 13A, the eNB 200A issues the command for attempting to detect the D2DSS to all of the D2D UEs 100A (100A-1, 100A-2, 100A-3, and 100A-4) in a broadcast manner.

Referring to FIG. 13B, the eNB 200A issues the command for attempting to detect the D2DSS only to the specific D2D UE 100A (100A-2). The specific D2D UE 100A (100A-2) is a dedicatedly set UE or a UE that satisfies the specific condition. Referring again to operation S1210, the eNB 200A provides the D2DSS detection-related information to the D2D UE 100A. A detection condition for the D2DSS is determined based on an absolute or relative signal strength (such as RSSI, RSRP, or the like). According to an embodiment, when issuing the command for attempting to detect the D2DSS, the eNB 200A notifies the D2D UEs of the corresponding detection condition. According to another embodiment, the detection condition is promised in advance between the eNB 200A and the UE 100A.

In operation S1220, the D2D UEs 100A that have received the command for attempting to detect the D2DSS attempts to detect the D2DSS. In operation S1230, the D2D UEs report the D2DSS detection result to the eNB 200A. The D2D UEs which are currently in the RRC_Idle state performs an RRC connection establishment process for the transition to the RRC_Connected state. For example, the UE enters a mode (or state) that reports the corresponding result to the eNB. In operation S1235, only when the D2DSS detection result satisfies the specific condition even though the D2DSS is detected, the D2D UEs reports the D2DSS detection result to the eNB 200A. Such specific condition is requested in advance by the eNB 200A, and includes contents of the following Table 3.

TABLE 3

(1) in which the reception signal strength of the D2DSS transmitted from the D2D UE within the same eNB is larger than a specific threshold value, or a case in which at least two of such signals are detected
(2) a case in which the signal strength (such as RSRP, RSRQ, SINR, or the like) of the serving cell signal is smaller than a specific threshold value In operation S1230 or operation S1235, the DD UEs report the D2DSS detection result to a serving cell, such as, the eNB 200A. The detection result reported to the eNB 200A includes the contents of the following Table 4.

TABLE 4

(1) the number, a sequence index (identifier), a signal strength, or the like of the D2DSSs transmitted from the D2D UE within the same eNB
(2) signal strength of serving cell signal
(3) battery level of the UE In operation S1240, the eNB 200A selects the specific UE to which the D2DSS is to be transmitted based on the detected result that has been reported in operation S1230 or operation S1235, and commands the selected specific UE to transmit the D2DSS. In operation S1250, the specific UE that has received the D2DSS transmission command from the eNB 200A transmits the D2DSS. The transmission of the D2DSS is performed without the command from the eNB 200A. The transmission of the D2DSS is performed without the command from the eNB 200A. For example, in operation S1245, the UE that has confirmed the detected result that satisfies the condition requested by the eNB 200A transmits the D2DSS without an additional command of the eNB in operation S1250. The eNB 200A activates the UE which remains in the RRC_Idle state until operation S1230 is completed, through paging or the like, so that the corresponding UE becomes in the RRC_Connected state. The eNB 200A commands the UEs selected for D2DSS transmission to periodically report the detected result, and thereby continuously update and manage a pool of the D2D UE that transmits the D2DSS.

Figure 14:
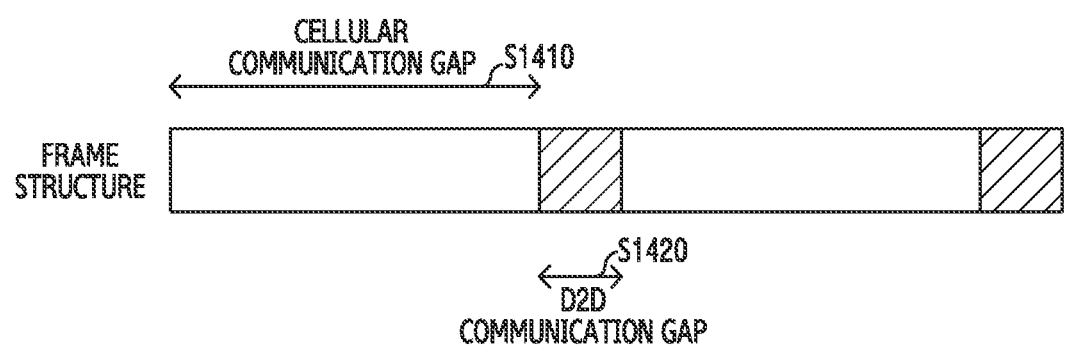
FIGS. 14 and 15 are views illustrating an example D2DSS detection operation in a UE according to this disclosure.

FIG. 14 is a view illustrating an example communication frame structure in a D2D UE to which this disclosure is applied. Referring to FIG. 14, a communication frame includes a cellular communication gap S1410 and a D2D communication gap S1420. When failing to detect a cellular synchronization signal (SS) transmitted from the adjacent eNB, the D2D UEs acquires synchronization information of the D2D UEs belonging to the adjacent eNB based on the D2DSS transmitted from the UE belonging to the adjacent eNB. First, when a D2D communication frequency of the adjacent eNB is different from that of the eNB, the eNB notifies the UEs of information about the D2D communication frequency in advance through an RRC message or system information.

The UE in which one reception chain is provided and that currently communicates with a serving eNB is difficult to detect the D2DSS. In this case, the eNB allocates a measurement gap to the UE through the RRC message or the like. For example, in the corresponding measurement gap, the UE does not transmit and receive signals with the serving eNB. However, the D2D signal such as a discovery signal is transmitted in a significantly long period such as in units of several hundreds of milliseconds (ms) to several seconds, as shown in FIG. 14. In this case, when the measurement gap is set according to the signal period of the D2DSS transmitted in the D2D communication gap S1420, a measurement gap that does not communicate with the serving eNB is significantly increased, which causes a problem in cellular communication. Thus, if the D2D UE is aware of an approximate time difference between the eNBs using SFN (System Frame Number) or the like, it is possible to more easily detect the D2DSS. According to an embodiment, time difference information such as an SFN difference between the eNBs is mutually shared through an interface between the eNBs. According to another embodiment, a high-order entity of the eNB transmits the time difference information such as the SFN difference between the eNBs, to each eNB. According to still another embodiment, in order to acquire the time difference information such as the SFN difference between the eNBs, the eNB commands a UE located in a cell boundary to measure and report SFN difference information with the adjacent cell. The eNB that has acquired the SFN difference information in this manner notifies the D2D LIB of the corresponding information, and set the measurement gap to be small using the corresponding information.

Figure 15:
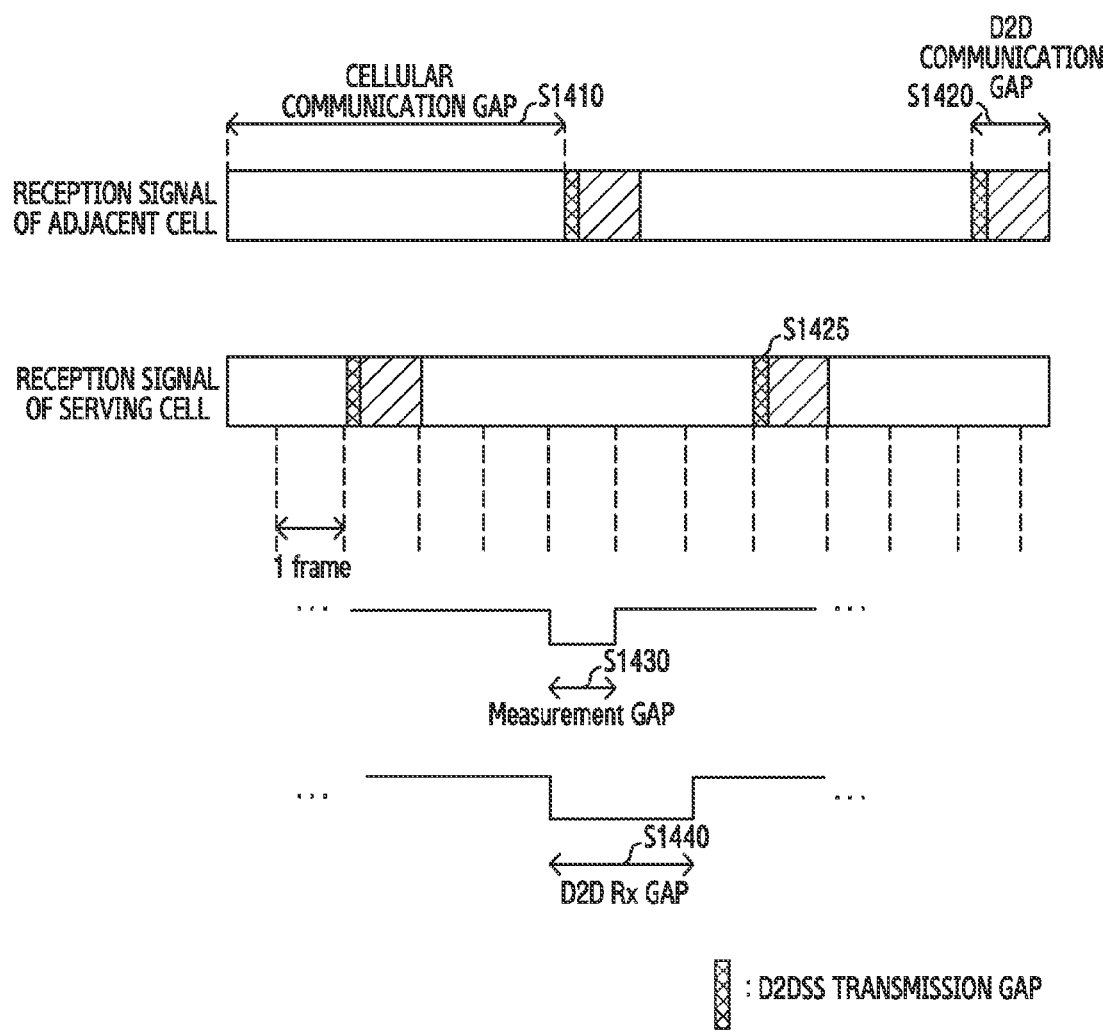

FIG. 15 is a view illustrating example patterns of measurement gaps by a D2DSS detection operation in a UE according to this disclosure. Referring to FIG. 15, an adjacent cell and a serving cell are deviated in synchronization. In this case, the D2D communication gap S1420 is 1 frame, and a D2DSS transmission gap S1425 is included in the D2D communication gap S1420) and thereby smaller than 1 frame. In order to detect the D2DSS, in one embodiment, a measurement gap S1430 is used, and in another embodiment, a D2D Rx GAP S1440 is used.

In one embodiment, in a case in which the serving eNB is aware of the SFN difference with the adjacent eNB, when 1 frame or 1.1 frame slightly larger than 1 frame is set as the measurement gap S1430 and allocated to the UE, a communication interruption time with the serving cell is significantly reduced. In the other embodiment, when 2 frame or 2.1 frame slightly larger than 2 frame is allocated to the UE as the D2D Rx GAP S1440, the UE measures the D2DSS and receive a D2D signal. For this, the serving eNB should be aware of D2D resource configuration information of the adjacent eNB. According to an embodiment, the D2D resource configuration information is mutually shared through the interface between the eNBs. According to another embodiment, the high-order entity of the eNB transmits the D2D resource configuration information to each eNB. According to still another embodiment, the eNB commands a UE located in a cell boundary to acquire and report system information with the adjacent cell.

Figure 16:
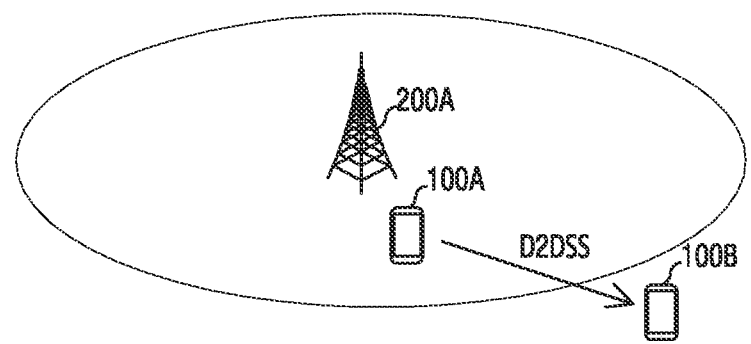
FIG. 16 is a view illustrating an operation of transmitting a D2DSS by a UE selected in an eNB according to this disclosure.

FIG. 16 is a view illustrating an example operation of transmitting a D2DSS by a UE selected in an eNB according to this disclosure. Referring to FIG. 16, the D2D UE 100A transmits the D2DSS to the UE 100B belonging to the adjacent eNB 200B. According to an embodiment, the D2D UE 100A transmits the D2DSS to the UE 100B belonging to the adjacent eNB 200B in response to a D2DSS transmission command received from the eNB 200A. According to another embodiment, the D2D UE 100A determines whether a D2DSS detection result satisfies a specific condition, and transmits the D2DSS to the UE 100B belonging to the adjacent eNB 200B when it is determined that the D2DSS detection result satisfies the specific condition.

Figure 17B:
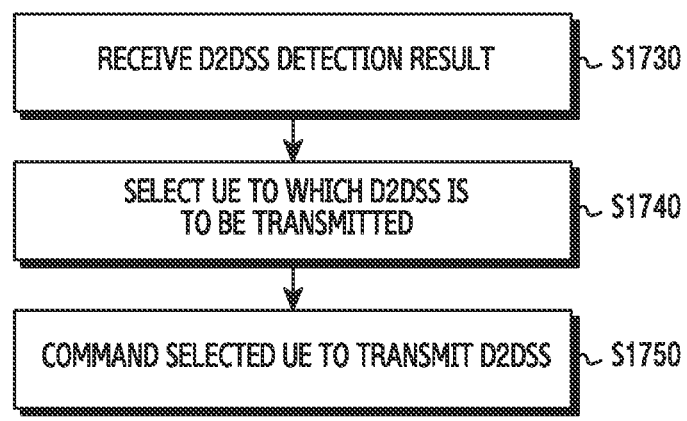

FIGS. 17A and 17B are views showing processing flows in an eNB for acquiring synchronization information between D2D UEs according to another exemplary embodiment of the present disclosure. These processing flows are performed by the eNB 200A shown in FIG. 11. Referring to FIG. 17A, in operation S1710, the eNB 200A issues a command for attempting to detect the D2DSS to D2D UEs belonging to the eNB 200A. According to an embodiment, the command for attempting to detect the D2DSS is issued to all of the D2D UEs belonging to the eNB 200A in a broadcast manner. According to another embodiment, the command for attempting to detect the D2DSS is issued only to a dedicated UE among the D2D UEs belonging to the eNB 200A. According to still another embodiment, the command for attempting to detect the D2DSS is issued only to a UE that satisfies a specific condition among the D2D UEs belonging to the eNB 200A. For example, the specific condition is a case in which the signal strength of the serving cell is smaller than a specific threshold value.

In addition, in operation S1710, the eNB 200A transmits D2DSS detection-related information to the D2D UEs belonging to the eNB 200A. According to an embodiment, the D2DSS detection-related information includes information about a D2D communication frequency or an operation frequency. According to another embodiment, the D2DSS detection-related information includes information about a measurement gap (S1430 or S1440 of FIG. 15) for D2DSS detection. The D2DSS detection-related information is provided through an RRC message or system information. Such D2DSS detection-related information is provided to the D2D UEs in advance before the command for attempting to detect the D2DSS is provided.

Referring to FIG. 17B, in operation S1730, the eNB 200A receives a D2DSS detection result. According to an embodiment, the D2DSS detection result includes information about the number, a sequence index, and strength of the D2DSSs transmitted from the D2D UE within the same eNB. According to another embodiment, the D2DSS detection result further includes information about the strength of servicing cell signals. According to still another embodiment, the D2DSS detection result further includes information about a battery level of the UE. In operation S1740, the eNB 200A selects a UE to which the D2DSS is to be transmitted based on the received D2DSS detection result. According to an embodiment, the eNB 200A selects a UE proximity to the UE 100B belonging to the adjacent eNB 200B while being located in a cell boundary, among the UEs belonging to the area of the eNB In operation S1750, the eNB 200A commands the selected UE to transmit the D2DSS.

Figure 18A:
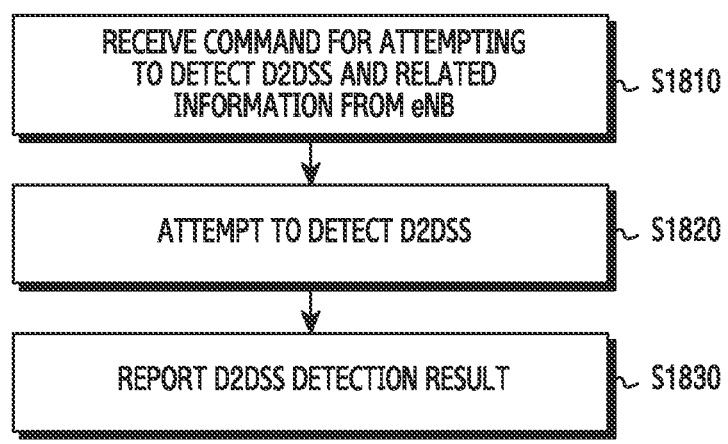
FIGS. 18A, 18B, and 18C are views illustrating example processing flows of a D2DSS detection operation in a D2D UE according to this disclosure.
Figure 18B:
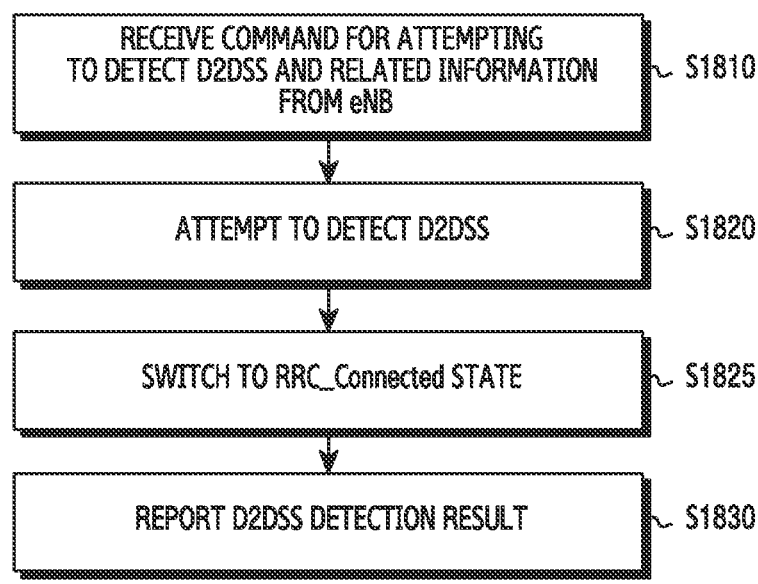
Figure 18C:
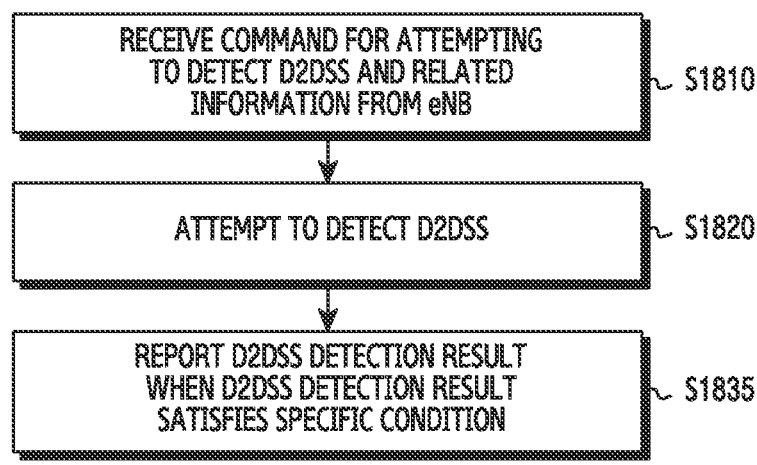

FIGS. 18A, 18B, and 18C are views illustrating example processing flows of a D2DSS detection operation in a D2D UE according to this disclosure. These processing flows are performed by the D2D UE 100A shown in FIG. 11. Referring to FIG. 18A, in operation S1810, the D2D UE 100A receives the command for attempting to detect the D2DSS from the eNB 200A. According to an embodiment, the command for attempting to detect the D2DSS is issued to all of the D2D UEs belonging to the eNB 200A in a broadcast manner. According to another embodiment, the command for attempting to detect the D2DSS is issued only to a dedicated UE among the D2D UEs belonging to the eNB 200A. According to still another embodiment, the command for attempting to detect the D2DSS is issued only to a UE that satisfies a specific condition among the D2D UEs belonging to the eNB 200A. For example, the specific condition is a case in which the signal strength of the serving cell is smaller than a specific threshold value.

In addition, in operation S1810, the D2D UE 100A receives D2DSS detection-related information from the eNB 200A. According to an embodiment, the D2DSS detection-related information includes information about a D2D communication frequency or an operation frequency. According to another embodiment, the D2DSS detection-related information includes information about a measurement gap for D2DSS detection. The D2DSS detection-related information is provided through an RRC message or system information. Such D2DSS detection-related information is received in advance before the command for attempting to detect the D2DSS is received.

In operation S1820, the D2D UE 100A attempts to detect the D2DSS in response to the received command for attempting to detect the D2DSS. In operation S1830, the D2D UE 100A reports a D2DSS detection result to the eNB 200A. According to an embodiment, the D2DSS detection result includes information about the number, a sequence index, and strength of the D2DSSs transmitted from the D2D UE within the same eNB. According to another embodiment, the D2DSS detection result further includes information about the strength of servicing cell signals. According to still another embodiment, the D2DSS detection result further includes information about a battery level of the UE.

Referring to FIG. 18B, in operation S1810, the D2D UE 100A receives, from the eNB 200A, the command for attempting to detect the D2DSS and D2DSS detection attempt-related information. In operation S1820, the D2D UE 100A attempts to detect the D2DSS in response to the received command for attempting to detect the D2DSS. In operation S1825, the D2D UE 100A that is currently in an RRC_Idle state switches from the RRC_Idle state to an RRC_Connected state in which the corresponding detection result is reported to the eNB, by performing an RRC connection establishment process. In operation S1830, the D2D UE 100A reports a D2DSS detection result to the eNB 200A.

Referring to FIG. 18C, in operation S1810, the D2D UE 100A receives, from the eNB 200A, the command for attempting to detect the D2DSS and the D2DSS detection attempt-related information. In operation S1820, the D2D UE 100A attempts to detect the D2DSS in response to the received command for attempting to detect the D2DSS. In operation S1835, the D2D UE 100A reports the D2DSS detection result to the eNB 200A only when the D2DSS detection result satisfies the specific condition. Such a specific condition is provided by the eNB 200A in advance. According to an embodiment, the specific condition includes a case in which the reception signal strength of the D2DSS transmitted from the D2D UE within the same eNB is larger than a specific threshold value, or a case in which at least two of such signals are detected. According to another embodiment, the specific condition includes a case in which the signal strength (such as RSRP, RSRQ, SINR, or the like) of the serving cell signals is smaller than a specific threshold value. According to still another embodiment, the specific condition includes a combination of the case in which the reception signal strength of the D2DSS transmitted from the D2D UE within the same eNB is larger than the specific threshold value or the case in which at least two of such signals are detected, and the case in which the signal strength (such as RSRP, RSRQ, SINR, or the like) of the serving cell signals is smaller than a specific threshold value.

Figure 19A:
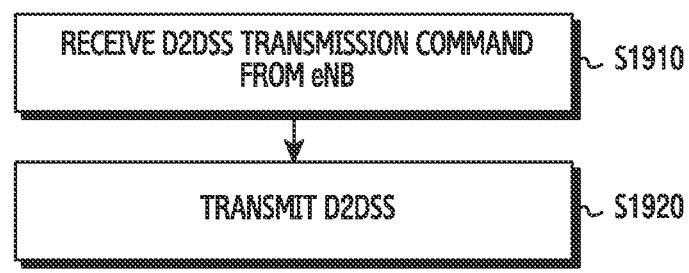
FIGS. 19A and 19B are views illustrating example processing flows of a D2DSS transmission operation in a D2D UE according to this disclosure.
Figure 19B:
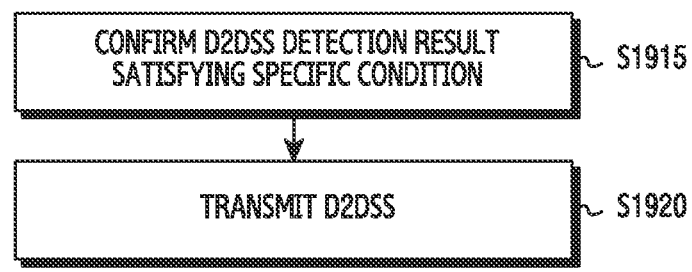

FIGS. 19A and 19B are views illustrating example processing flows of a D2DSS transmission operation in a D2D UE according to this disclosure. These processing flows are performed by the D2D UE 100A shown in FIG. 11. In this instance, the D2D 100A is a UE that is selected by the eNB 200A based on the D2DSS detection result. Referring to FIG. 19A, in operation S1910, the D2D UE 100A receives a D2DSS transmission command from the eNB 200A. In operation S1920, the D2D UE 100A transmits the D2DSS to the UE 100B belonging to the adjacent eNB 200B in response to the received D2DSS transmission command. Referring to FIG. 19B, in operation S1915, the D2D UE 100A determines whether the D2DSS detection result satisfies a specific condition. In operation S1920, when it is determined that the D2DSS detection result satisfies the specific condition, the D2D UE 100A transmits the D2DSS to the UE 100B belonging to the adjacent eNB 200B.

Figure 20:
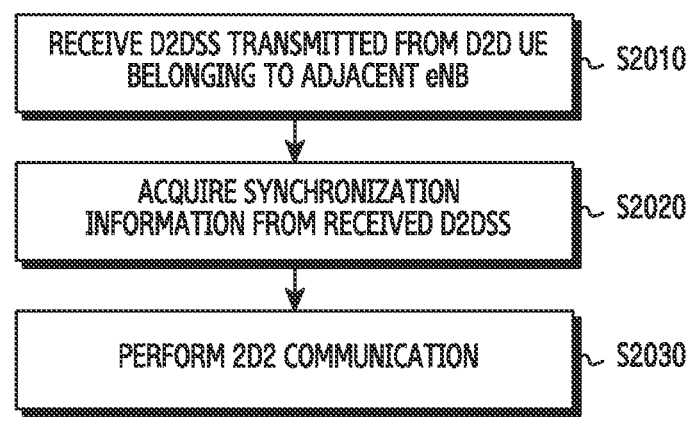
FIG. 20 is a view illustrating an example processing flow of an operation of acquiring synchronization information between D2D UEs according to this disclosure.

FIG. 20 is a view showing a processing flow of an operation of acquiring synchronization information between D2D UEs according to another exemplary embodiment of the present disclosure. This processing flow are performed by the D2D UE 110B shown in FIG. 11. Referring to FIG. 20, in operation S2010, the D2D UE 1003 belonging to the eNB 200B receives the D2DSS transmitted from the D2D UE 100A belonging to the adjacent eNB 200A. In operation S2020, the D2D UE 100B acquires synchronization information from the received D2DSS. In operation S2030, the D2D UE 110B performs D2D communication with the D2D UE 100A belonging to the eNB 200A using the acquired synchronization information.

Figure 21:
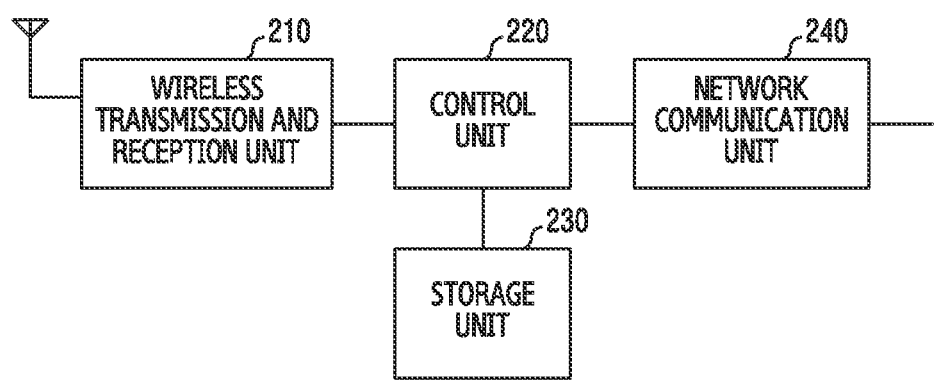
FIG. 21 is a view illustrated a structure of an example eNB for an operation of acquiring synchronization information between D2D UEs according to this disclosure.

FIG. 21 is a view showing the structure of an eNB device for an operation of acquiring synchronization information between D2D UEs according to exemplary embodiments of the present disclosure. Such an eNB device is included in the eNB 200 shown in FIG. 1 or the eNB 200A shown in FIG. 11. Referring to FIG. 21, an eNB includes a wireless transmission and reception unit 210, a control unit 220, a storage unit 230, and a network communication unit 240. The wireless transmission and reception unit 210 (or transceiver) performs a function for transmitting and receiving signals through a wireless channel, such as band conversion or amplification of signals. The wireless transmission and reception unit 210 up-converts a baseband signal for transmission into an RF band signal, and then transmits the up-converted signal via an antenna. In addition, the wireless transmission and reception unit 210 down-converts the RE band signal received via the antenna into the baseband signal. For example, the wireless transmission and reception unit 210 includes a transmission filter, a reception filter, an amplifier, a mixer, an oscillator, a DAC, an ADC, and the like. In FIG. 21, a case in which only a single antenna is included in the eNB is shown, but the eNB includes a plurality of antennas.

The network communication unit 240 provides an interface for performing communication with other nodes within a network. For example, the network communication unit 240 processes signals transmitted to other eNBs or a high-order (such as core network) entity, and processes signals received from the other eNBs or the high-order entity. According to an embodiment, the network communication unit 240 receives, from the high-order entity, information concerning that a shadow area is present in a place adjacent to the corresponding eNB or the adjacent eNB is not properly operated.

The storage unit 230 stores basic programs for operating the eNB, application programs, and data such as setting information. In addition, the storage unit 230 provides the stored data in response to the request of the control unit 220. The control unit 220 controls overall operations of the eNB. The control unit 220 includes at least one processor. According to the embodiments of the present disclosure, the control unit 220 performs control operations so that the D2D UEs in which no synchronization is taken place mutually acquires synchronization information. According to an embodiment, the control unit 220 performs operations according to the processing flow shown in FIGS. 2A to 2D and the processing flow shown in FIGS. 7A and 7B. According to another embodiment, the control unit 220 performs operations according to the processing flow shown in FIGS. 12A to 12D and the processing flow shown in FIGS. 17A and 17B.

According to an embodiment of the present disclosure, an eNB device that serves a second UE inside a cell for D2D communication with a first UE outside the cell includes a transmission and reception unit and a control unit. The transmission and reception unit commands a UE inside at least one cell including the second UE to detect a D2DSS. The control unit selects a specific UE among at least one UEs based on a D2DSS detection result that has been reported by the at least one UE. The transmission and reception unit commands the selected specific UE to transmit the D2DSS to the first UE.

According to an embodiment of the present disclosure, an eNB device includes a receiver that receives the D2DSS detection result from the UE. The D2DSS detection result includes a result obtained by detecting a synchronization signal of another UE in a predetermined measurement gap by the UE. A start time point of the measurement gap in a first measurement gap period and a start time point of the measurement gap in a second measurement gap period are different from each other. According to an embodiment, an offset pattern of the start time point of the measurement gap in the first measurement gap period and an offset pattern of the start time point of the measurement gap in the second measurement gap period are different from each other.

According to an embodiment, a sum of the measurement gaps in each of predetermined measurement gap periods is larger than or equal to a transmission period of the synchronization signal between the UE and the other UE. According to an embodiment, the measurement gap is a gap in which the UE does not perform communication with the eNB. According to an embodiment, the eNB device further includes a transmitter that transmits information about the measurement gap and the first and second measurement gap periods to the UE. According to an embodiment, the detection result includes the number, the strength, and an identifier of the synchronization signals transmitted from the other UE.

Figure 22:
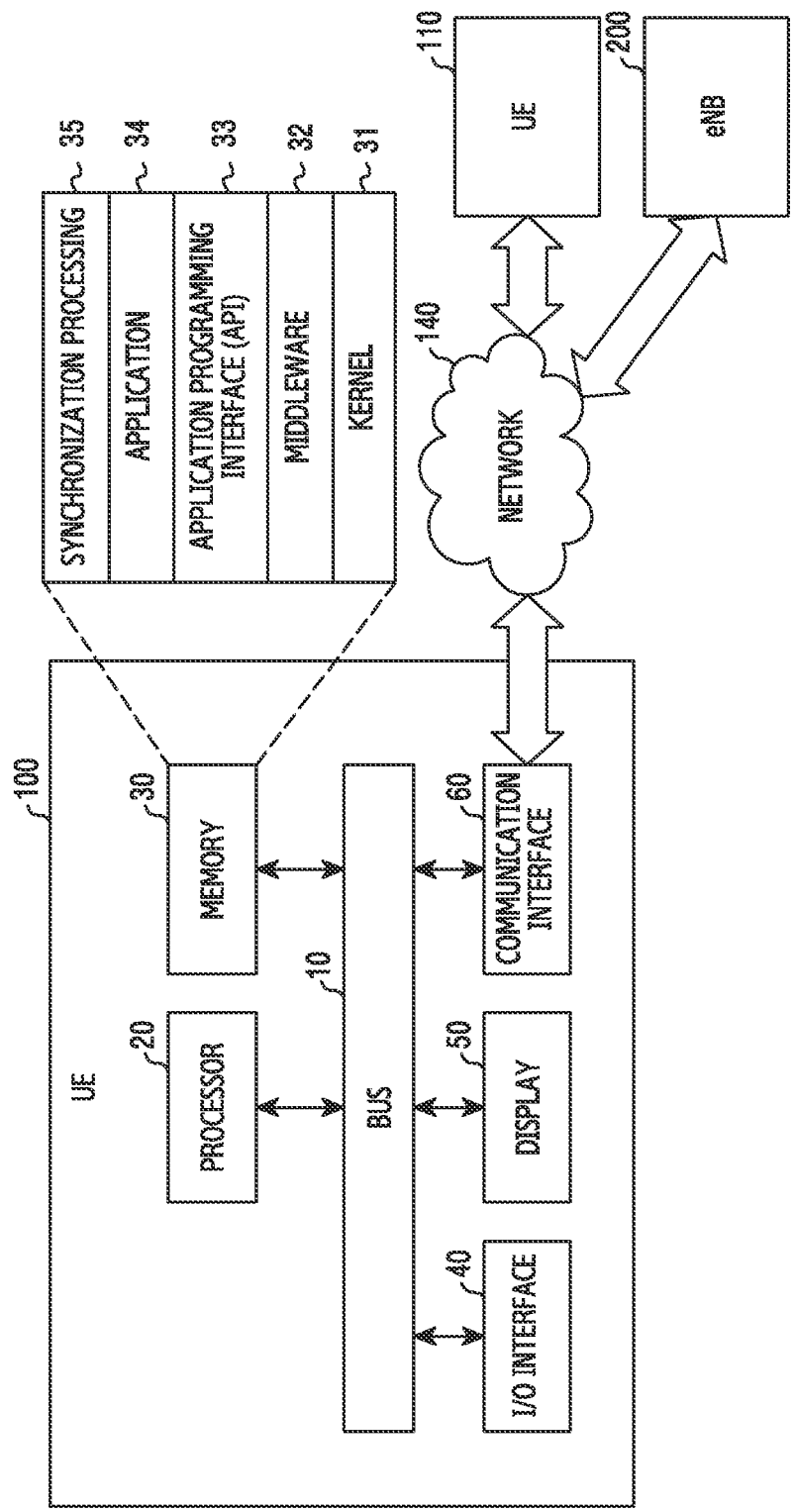
FIG. 22 is a view illustrating an example structure of a D2D UE for an operation of acquiring synchronization information between D2D UEs according to this disclosure.

FIG. 22 is a view illustrating an example structure of a D2D UE device for an operation of acquiring synchronization information between D2D UEs according to this disclosure. Such a UE device can be included in the UE 100 shown in FIG. 1. The UE 100A shown in FIG. 11 can be configured in the same manner.

Referring to FIG. 22, the UE device 100 includes a bus 10, a processor 20, a memory 30, an I/O (input/output) interface 40, a display 50, and a communication interface 60.

The bus 10 is a circuit that mutually connects the above-described components and transmits communication (such as a control message) among the above-described components.

The processor 20 receives instructions from the above-described other components (such as the memory 30, the I/O interface 40, the display 50, the communication interface 60, or the like) through the bus 10, decode the received instructions, and perform operations or data processing according to the decoded instructions.

The memory 30 stores an instruction or data received from the processor 20 or the other components (such as the I/O interface 40, the display 50, the communication interface 60, or the like) or generated by the processor 20 or the other components. The memory 30 includes programming modules, for example, a kernel 31, middleware 32, an Application Programming Interface (API) 33, applications 34, and the like. In addition, the memory 30 includes a synchronization processing module 35 for a synchronization operation (or synchronization function) according to various embodiments of the present disclosure. The above-described individual programming modules are formed with hardware, or a combination of hardware and at least one of software or firmware.

The kernel 31 controls or manage system resources (such as the bus 10, the processor 20, or the memory 30) used to execute operations or functions which have been implemented in the remaining other programming modules, for example, the middleware 32, the API 33, the applications 34, and the synchronization processing module 35. In addition, the kernel 31 provides an interface that accesses individual components of the UE device 100 in the middleware 32, the API 33, the applications 34, or the synchronization processing module 35 to thereby control or manage the individual components thereof.

The middleware 32 acts as an intermediary so that the API 33, the applications 34, or the synchronization module 35 communicates with the kernel 31 to transmit and receive data. In addition, with regard to operation requests received from the applications 34, the middleware 32 performs control (such as scheduling or load balancing) for the operation requests, using a method of assigning a priority capable of using the system resources (such as the bus 10, the processor 20, or the memory 30) of the UR device 100 to, for example, at least one application of the applications 34, or the like.

The API 33 is an interface for controlling a function provided from the kernel 31 or the middle 32 by the applications 34, and includes, for example, at least one interface or function (such as a command) for file control, window control, image processing, or character control, and the like.

The applications 34 include a variety of applications. For example, the applications 34 include an SMS/MMS application, an e-mail application, a calendar application, an alarm application, a health care application (such as an application for measuring the quantity of exercise or blood glucose, or the like), an environmental information application (such as an application for providing air pressure, humidity, temperature information, and the like), and the like.

The synchronization processing module 35 performs a control operation so that the D2D UEs in which no synchronization is taken place mutually acquires synchronization information. According to an embodiment, the synchronization processing module 35 performs operations according to the processing flows shown in FIGS. 2A to 2D, the processing flows shown in FIGS. 8a to 8c, the processing flows shown in FIGS. 9A and 9B, and the processing flow shown in FIG. 10. According to another embodiment, the synchronization processing module 35 performs operations according to the processing flows shown in FIGS. 12A to 12D, the processing flows shown in FIGS. 18A to 18C, the processing flows shown in FIGS. 19A and 19B, and the processing flow shown in FIG. 20.

The I/O interface 40 transmits an instruction or data input from a user through an input and output device (such as a sensor, a keyboard, or a touch screen), to the processor 20, the memory 30, the communication interface 60 through, for example, the bus 10. For example, the I/O interface 40 provides data about a user's touch input through a touch screen to the processor 20. In addition, the I/O interface 40 outputs the instruction or data received from the processor 20, the memory 30, and the communication interface 60 via, for example, the bus 10, through the input and output device (such as a speaker or a display). For example, the I/O interface 40 outputs voice data that has been processed through the processor 20 to a user through the speaker.

The display 50 displays a variety of information (such as multimedia data or text data) to a user. The communication interface 60 (or the transceiver) connects communication between the UE 100 and the eNB 200 and communication between the UE 100 and another UE 110. For example, the communication interface 60 is connected to a network 140 through wireless communication to support communication between the UE 100 and the eNB 200. By way of another example, the communication interface 60 is connected to the network 140 through wireless communication to support D2D communication between the UE and the other UE 110. The wireless communication includes at least one of, for example, Wireless Fidelity (Wi Fi), BLUETOOTH® (BT), Near Field Communication (NFC), Global Positioning System (GPS), and cellular communication (such as LTE, LTE-A, CDMA, WCDMA, UMTS, WiBro, GSM, or the like).

The network 140 is a telecommunications network. The telecommunications network includes at least one of a computer network, the Internet, the Internet of things, and a telephone network. According to an embodiment, a protocol for D2D communication between the UE 100 and the external UE 110 is supported from at least one of the applications 34, the application programming interface 33, the middleware 32, the kernel 31, and the communication interface 60.

According to an embodiment of the present disclosure, a second UE device inside a cell for D2D communication with a first UE outside the cell includes a communication interface and a synchronization processing module. The synchronization processing module detects a D2DSS in response to a command for detecting the D2DSS transmitted from an eNB that serves the second UE, reports the D2DSS detection result to the eNB through the communication interface, and transmits the D2DSS to the first UE in response to a D2DSS transmission command received from the eNB after reporting the D2DSS detection result.

A UE device according to an embodiment of the present disclosure includes a processor that detects a synchronization signal of another UE in a predetermined measurement gap, and a transmitter that transmits the detection result to an eNB. A start time point of the measurement gap in a first measurement gap period and a start time point of the measurement gap in a second measurement gap period are different from each other. According to an embodiment, an offset pattern of the start time point of the measurement gap in the first measurement gap period and an offset pattern of the start time point of the measurement gap in the second measurement gap period are different from each other. According to an embodiment, a sum of the measurement gaps in each of predetermined measurement gap periods is larger than or equal to a transmission period of the synchronization signal between the UE and the other UE. According to an embodiment, the measurement gap is a gap in which the UE does not perform communication with the eNB.

According to an embodiment, the UE device further includes a receiver that receives information about the measurement gap and the first and second measurement gap periods from the eNB. According to an embodiment of the present disclosure, the transmitter transmits the detected result to the eNB when the detected result satisfies a specific condition. The specific condition includes one of a case in which a reception signal strength of the synchronization signal transmitted from the other UE is larger than a specific threshold value and a case in which a reception signal strength of a signal transmitted from the eNB is smaller than a specific threshold value. According to an embodiment, the detected result includes the number, strength, and an identifier of the synchronization signals transmitted from the other UE. According to an embodiment, the transmitter further transmits the synchronization signal to the other UE.

As described herein, according to the embodiments of the present disclosure, there are provided the method and apparatus that mutually acquires synchronization information by the D2D UEs in which no synchronization is taken place, thereby improving the efficiency of synchronization signal searching performed by the neighboring D2D UEs.

Although the present disclosure has been described by the restricted embodiments and the drawings as described above, the present disclosure is not limited to the aforementioned embodiments, and various modifications and alterations is made from the descriptions by those skilled in the art to which the present disclosure pertains.

Operations according to this disclosure can be implemented by a single controller. In this case, program commands for executing operations, which are implemented by various computers, can be recorded in a computer-readable recording medium. The computer readable medium includes a program command, a data file, a data structure, and the like independently or in combination. The program commands can be those designed and configured especially for the present disclosure or those known to and usable by a person skilled in the art. For example, the computer readable recoding medium includes magnetic media such as a hard disk, a floppy disk, and a magnetic tape, optical media such as a CD-ROM and a DVD, magneto-optical media such as a floptical disk, and hardware devices such as a ROM, RAM, and a flash memory, which are specially constructed in such a manner that they stores and execute a program command. Examples of the program command include a machine language code generated by a compiler and a high-level language code executable by a computer through an interpreter and the like. When all or some of the eNBs or the relays described in the present disclosure are implemented by a computer program, a computer-readable recording medium that stores the computer program is also included in the present disclosure. Therefore, the scope of the present disclosure is not limited to the embodiment described above, and should be defined by the accompanying claims and the equivalents of the claims.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a terminal in a wireless communication system, the method comprising:
    measuring at least one neighboring terminal at a device to device (D2D) operation frequency, based on a measurement gap; and
    transmitting a measurement result to a base station if a condition relating to a received signal strength of at least one signal transmitted from the base station is satisfied,
    wherein the measurement result includes information regarding a signal transmitted from the at least one neighboring terminal, and wherein the measurement gap is shorter than a transmission period of the signal and repeated over a plurality of periods.

2. The method of claim 1, further comprising:
receiving information regarding the D2D operation frequency from the base station.

3. The method of claim 1, further comprising:
receiving information regarding the measurement gap, a first measurement gap period and a second measurement gap period from the base station,
wherein a start time point of the measurement gap in the first measurement gap period and a start time point of the measurement gap in the second measurement gap period are different from each other.

4. The method of claim 3, wherein an offset pattern of the start time point of the measurement gap in the first measurement gap period and an offset pattern of the start time point of the measurement gap in the second measurement gap period are different from each other,
wherein the measurement gap is a gap in which the terminal does not perform communication with the base station, and
wherein a sum of the measurement gaps in each of the plurality of periods is larger than or equal to a transmission period of a synchronization signal between the terminal and the neighboring terminal.

5. The method of claim 1, wherein the condition includes one of a case in which a received signal strength of the signal transmitted from the at least one neighboring terminal is larger than a threshold value and a case in which a received signal strength of a signal transmitted from the base station is smaller than a threshold value.

6. The method of claim 1, wherein the measurement result includes a number, a strength, and an identifier of the signal transmitted from the at least one neighboring terminal.

7. A method for operating a base station in a wireless communication system, the method comprising:
receiving a measurement result from a terminal, if a condition relating to a received signal strength of at least one signal transmitted from the base station is satisfied,
wherein the measurement result includes information regarding a signal transmitted from at least one neighboring terminal, which is measured at a device to device (D2D) operation frequency by the terminal, based on a measurement gap, and
wherein the measurement gap is shorter than a transmission period of the signal and repeated over a plurality of periods.

8. The method of claim 7, further comprising:
transmitting information regarding the D2D operation frequency to the terminal.

9. The method of claim 7, further comprising:
transmitting information regarding the measurement gap, a first measurement gap period and a second measurement gap period to the terminal,
wherein a start time point of the measurement gap in the first measurement gap period and a start time point of the measurement gap in the second measurement gap period are different from each other.

10. The method of claim 9, wherein an offset pattern of the start time point of the measurement gap in the first measurement gap period and an offset pattern of the start time point of the measurement gap in the second measurement gap period are different from each other,
wherein the measurement gap is a gap in which the terminal does not perform communication with the base station, and
wherein a sum of the measurement gaps in each of the plurality of periods is larger than or equal to a transmission period of a synchronization signal between the terminal and the neighboring terminal.

11. The method of claim 7, wherein the condition includes one of a case in which a received signal strength of the signal transmitted from the at least one neighboring terminal by the terminal is larger than a threshold value and a case in which a received signal strength of a signal transmitted received from the base station by the terminal is smaller than a threshold value.

12. The method of claim 7, wherein the measurement result includes a number, a strength, and an identifier of synchronization signals transmitted from the neighboring terminal.

13. A terminal in a wireless communication system, the terminal comprising:
at least one processor configured to measure at least one neighboring terminal at a device to device (D2D) operation frequency, based on a measurement gap; and
a transceiver configured to transmit a measurement result to a base station, if a condition relating to a received signal strength of at least one signal transmitted from the base station is satisfied,
wherein the measurement result includes information regarding a signal transmitted from the at least one neighboring terminal, and
wherein the measurement gap is shorter than a transmission period of the signal and repeated over a plurality of periods.

14. The terminal of claim 13, wherein the transceiver is further configured to receive information regarding the D2D operation frequency from the base station.

15. The terminal of claim 13, wherein the transceiver is further configured to receive information regarding the measurement gap, a first measurement gap period and a second measurement gap period from the base station, and
wherein a start time point of the measurement gap in the first measurement gap period and a start time point of the measurement gap in the second measurement gap period are different from each other.

16. The terminal of claim 15, wherein an offset pattern of the start time point of the measurement gap in the first measurement gap period and an offset pattern of the start time point of the measurement gap in the second measurement gap period are different from each other,
wherein the measurement gap is a gap in which the terminal does not perform communication with the base station, and
wherein a sum of the measurement gaps in each of the plurality of periods is larger than or equal to a transmission period of a synchronization signal between the terminal and the neighboring terminal.

17. The terminal of claim 13, wherein the condition includes one of a case in which a received signal strength of the signal transmitted from the at least one neighboring terminal is larger than a threshold value and a case in which a received signal strength of a signal transmitted from the base station is smaller than a threshold value.

18. The terminal of claim 13, wherein the measurement result includes a number, a strength, and an identifier of the signal transmitted from the neighboring terminal.

19. A base station in a wireless communication system, the base station comprising:

a transceiver configured to receive a measurement result from a terminal, if a condition relating to a received signal strength of at least one signal transmitted from the base station is satisfied, wherein the measurement result includes information regarding a signal transmitted from at least one neighboring terminal, which is measured at a device to device (D2D) operation frequency by the terminal, based on a measurement gap, and wherein the measurement gap is shorter than a transmission period of the signal and repeated over a plurality of periods.

20. The base station of claim 19, wherein the transceiver is further configured to transmit information regarding the D2D operation frequency to the terminal.

21. The base station of claim 19, wherein the transceiver is further configured to transmit information regarding the measurement gap, a first measurement gap period and a second measurement gap period to the terminal, and wherein a start time point of the measurement gap in the first measurement gap period and a start time point of the measurement gap in the second measurement gap period are different from each other.

22. The base station of claim 21, wherein an offset pattern of the start time point of the measurement gap in the first measurement gap period and an offset pattern of the start time point of the measurement gap in the second measurement gap period are different from each other, wherein the measurement gap is as gap in which the terminal does not perform communication with the base station, and wherein a sum of the measurement gaps in each of the plurality of periods is larger than or equal to a transmission period of a synchronization signal between the terminal and the neighboring terminal.

23. The base station of claim 19, wherein the condition includes one of a case in which a received signal strength of the signal transmitted from the at least one neighboring terminal by the terminal is larger than a threshold value and a case in which a received signal strength of a signal transmitted from the base station by the terminal is smaller than a threshold value.

24. The base station of claim 19, wherein the measurement result includes a number, a strength, and an identifier of synchronization signals transmitted from the neighboring terminal.

* * * * *